United States Patent
Zatonyi et al.

(10) Patent No.: US 10,096,151 B2
(45) Date of Patent: Oct. 9, 2018

(54) METHODS AND SYSTEMS FOR THREE-DIMENSIONAL VISUALIZATION OF DEVIATION OF VOLUMETRIC STRUCTURES WITH COLORED SURFACE STRUCTURES

(71) Applicant: Varian Medical Systems International AG, Cham (CH)

(72) Inventors: Janos Zatonyi, Baden (CH); Marcin Novotni, Baden (CH); Patrik Kunz, Baden (CH)

(73) Assignee: Varian Medical Systems International AG (CH)

( * ) Notice: Subject to any disclaimer, the term of this patent is extended or adjusted under 35 U.S.C. 154(b) by 0 days.

(21) Appl. No.: 14/793,513

(22) Filed: Jul. 7, 2015

(65) Prior Publication Data
US 2017/0011546 A1    Jan. 12, 2017

(51) Int. Cl.
    *G06T 15/87* (2011.01)
    *G06T 15/10* (2011.01)
    *G06T 15/04* (2011.01)
    *G06T 15/50* (2011.01)
    *G06T 15/08* (2011.01)

(52) U.S. Cl.
    CPC .................. *G06T 15/503* (2013.01)

(58) Field of Classification Search
    CPC .................................................... G06T 15/87
    See application file for complete search history.

(56) References Cited

U.S. PATENT DOCUMENTS

| | | | |
|---|---|---|---|
| 8,781,250 B2 * | 7/2014 | Zitnick | G06T 5/003 348/208.4 |
| 8,805,036 B2 * | 8/2014 | Thiele | A61B 5/4848 382/128 |

(Continued)

OTHER PUBLICATIONS

Silke Hacker and Heinz Handels, "Representation and visualization of variability in a 3D anatomical atlas using the kidney as an example", Proc. of SPIE vol. 6141, 61410B, (2006).*

*Primary Examiner* — Sing-Wai Wu
(74) *Attorney, Agent, or Firm* — Eric L. Sophir; Dentons US LLP

(57) ABSTRACT

Embodiments of the present disclosure are directed to methods and computer systems for converting datasets into three-dimensional ("3D") mesh surface visualization, displaying the mesh surface on a computer display, comparing two three-dimensional mesh surface structures by blending two primary different primary colors to create a secondary color, and computing the distance between two three-dimensional mesh surface structures converted from two closely-matched datasets. For qualitative analysis, the system includes a three-dimensional structure comparison control engine that is configured to convert dataset with three-dimensional structure into three-dimensional surfaces with mesh surface visualization. The control engine is also configured to assign color and translucency value to the three-dimensional surface for the user to do qualitative comparison analysis. For quantitative analysis, the control engine is configured to compute the distance field between two closely-matched datasets.

18 Claims, 28 Drawing Sheets

(56) References Cited

U.S. PATENT DOCUMENTS

| | | | |
|---|---|---|---|
| 2006/0187236 A1* | 8/2006 | Runnels | H05B 33/0863 345/593 |
| 2007/0103462 A1* | 5/2007 | Miller | G06T 15/405 345/421 |
| 2008/0044104 A1* | 2/2008 | Gering | G06K 9/6203 382/294 |
| 2008/0118182 A1* | 5/2008 | Koole | G06T 5/50 382/284 |
| 2009/0063118 A1* | 3/2009 | Dachille | G06F 17/30262 703/11 |

* cited by examiner

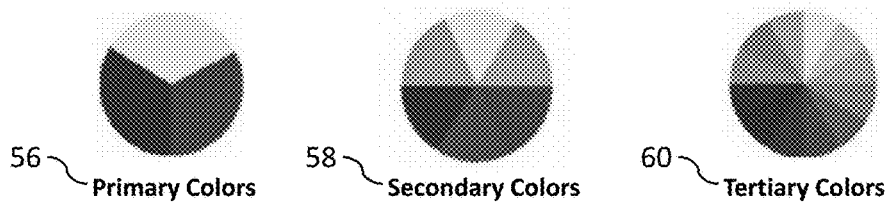

Primary Colors: Red, yellow and blue

In traditional color theory (used in paint and pigments), primary colors are the 3 pigment colors that cannot be mixed or formed by any combination of other colors. All other colors are derived from these 3 hues.

Secondary Colors: Green, orange and purple

These are the colors formed by mixing the primary colors.

Tertiary Colors: Yellow-orange, red-orange, red-purple, blue-purple, blue-green & yellow-green
These are the colors formed by mixing a primary and a secondary color. That's why the hue is a two word name, such as blue-green, red-violet, and yellow-orange.

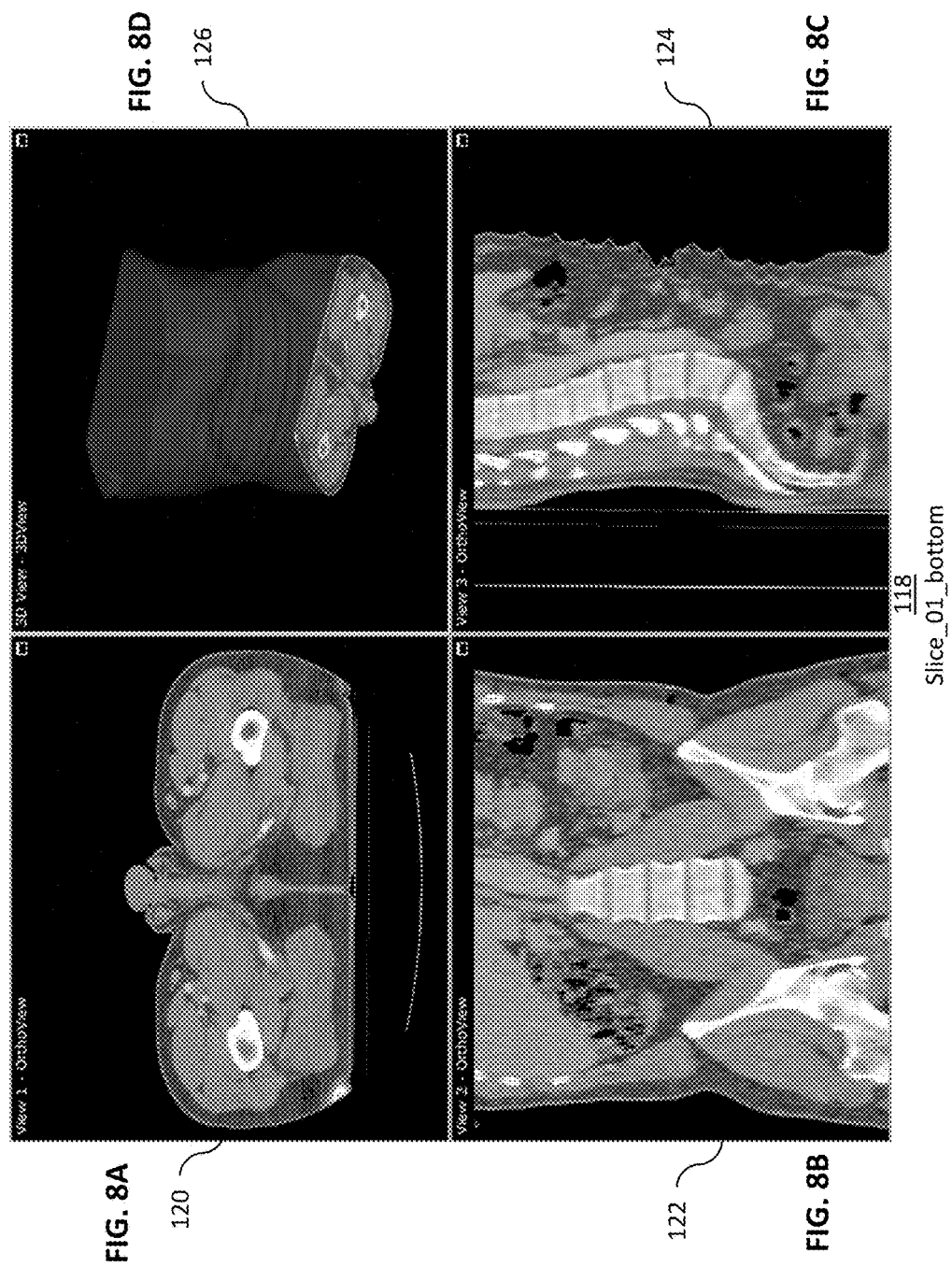

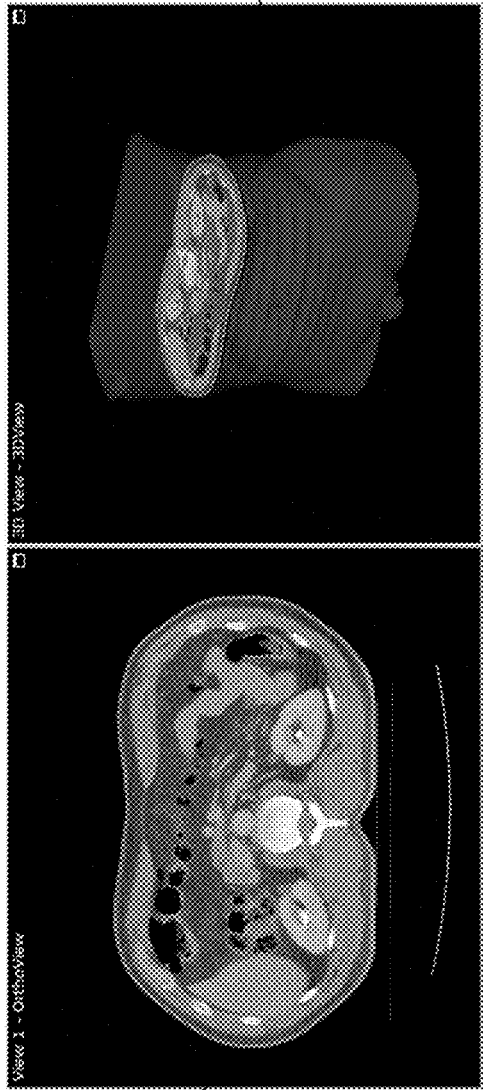
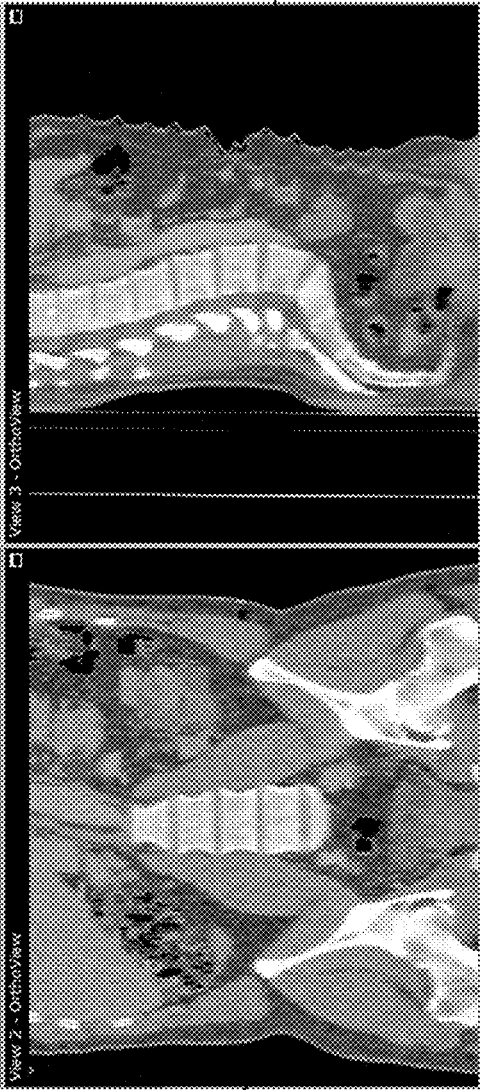
FIG. 8M  FIG. 8N  FIG. 8O  FIG. 8P

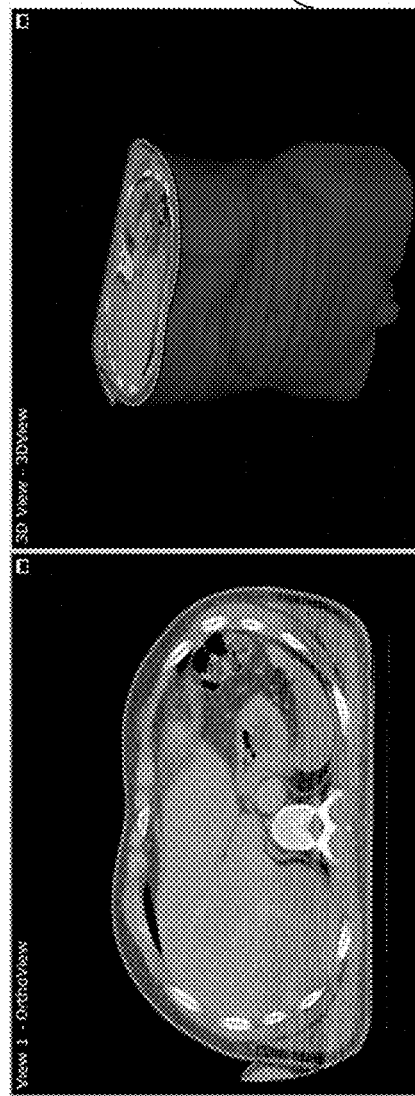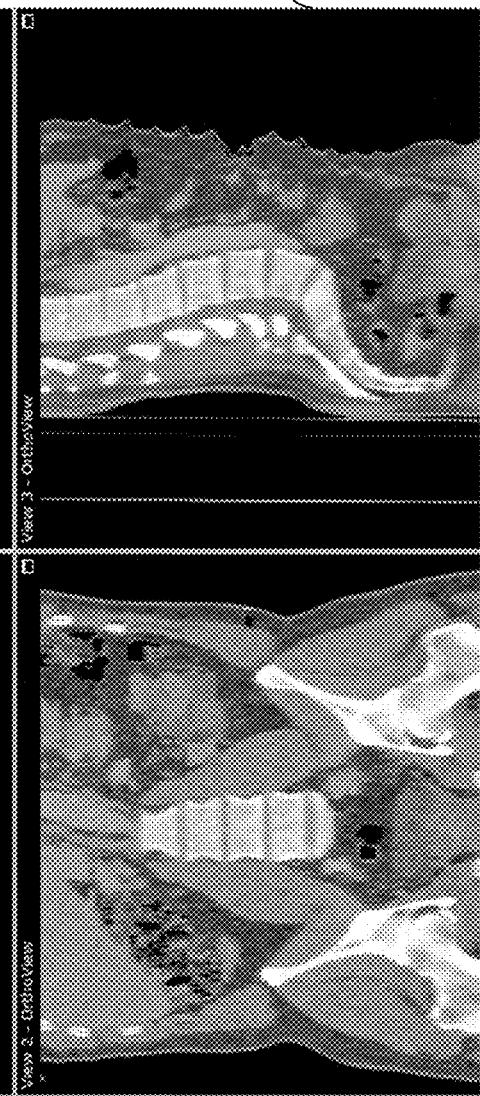

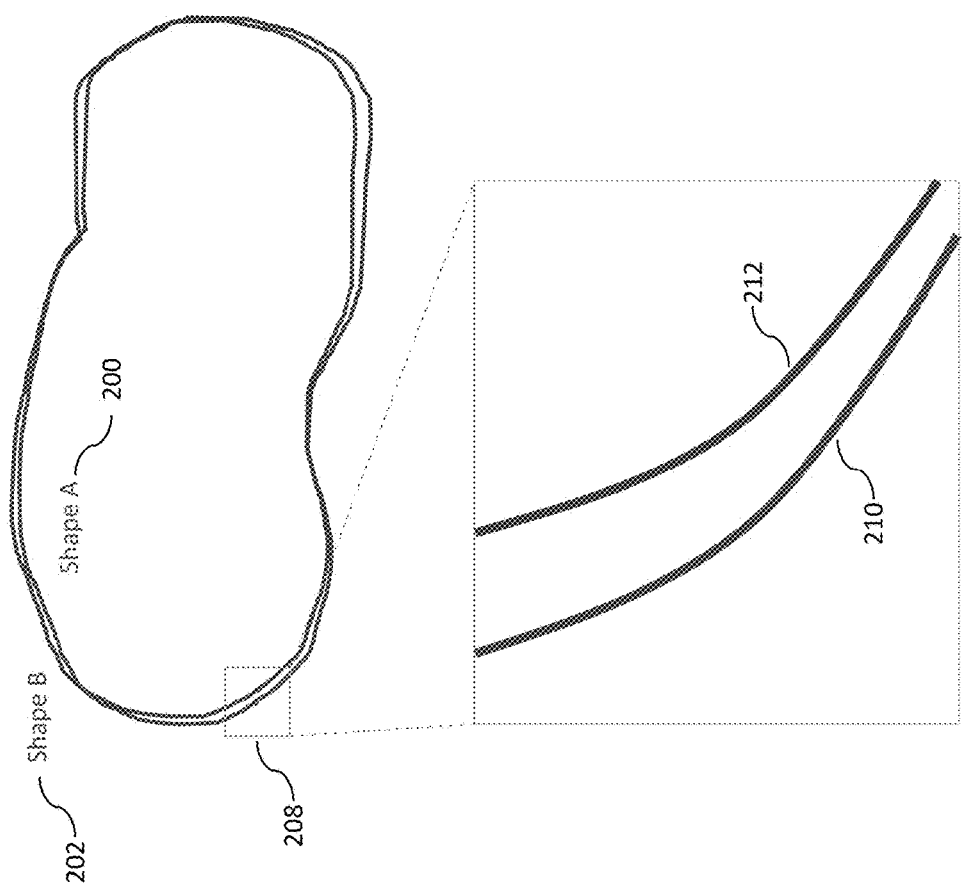

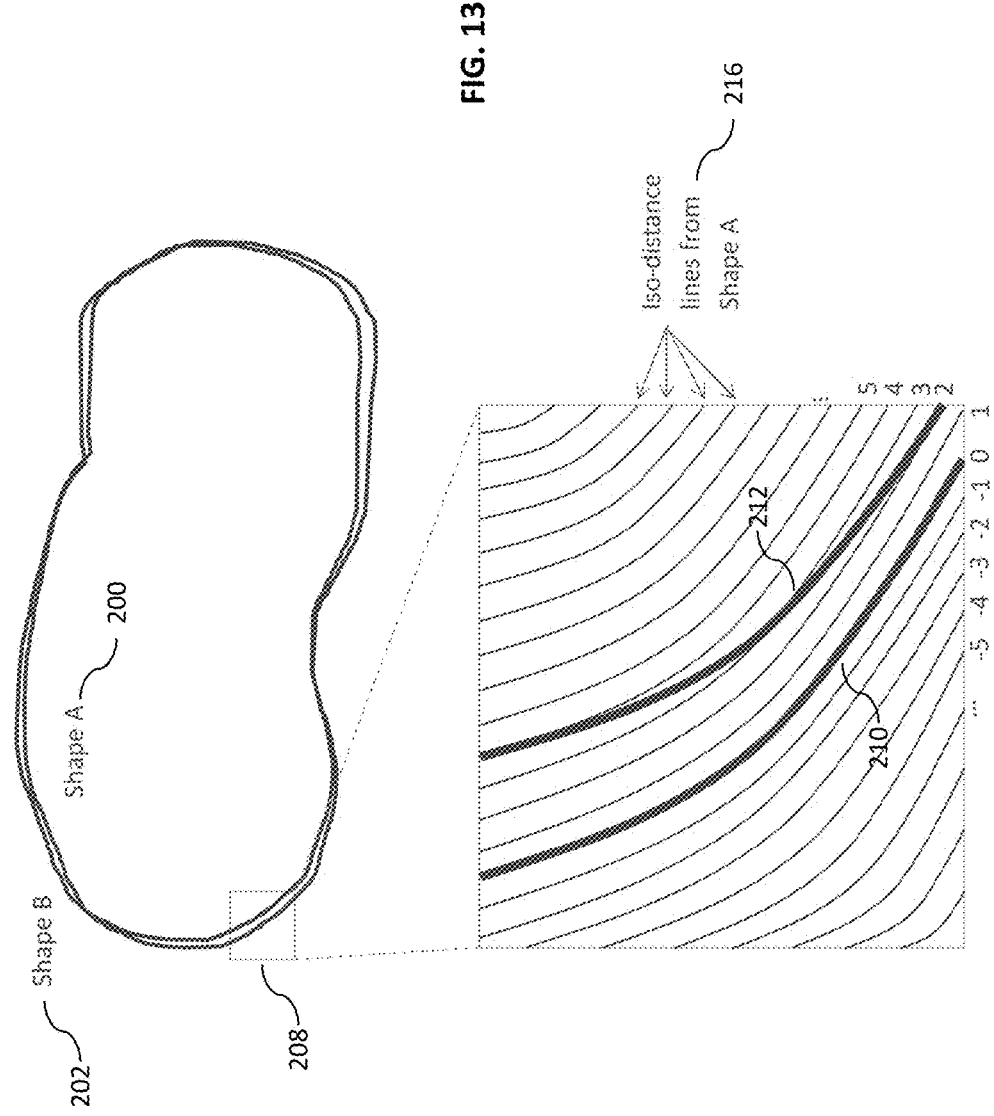

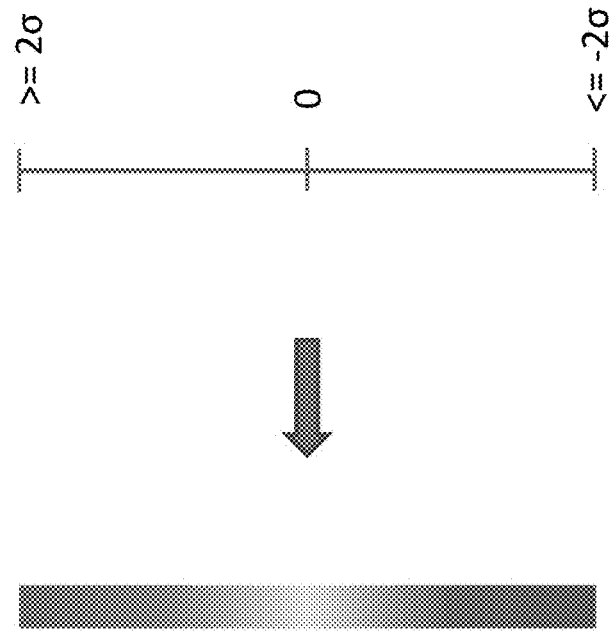

METHODS AND SYSTEMS FOR THREE-DIMENSIONAL VISUALIZATION OF DEVIATION OF VOLUMETRIC STRUCTURES WITH COLORED SURFACE STRUCTURES

TECHNICAL FIELD

The present invention relates generally to the interdisciplinary fields of image data analysis and computer system, and more particularly to the dataset analysis and computer system for transforming datasets to three-dimensional mesh surface structure to display on a computer display and for computing the deviations between the structures to color code the quantified deviations on the computer display.

BACKGROUND ART

Three-dimensional imaging on a computer display has become more prevalent in recent years with the advancement of computing power and computer modeling. Active research and development in biological science and engineering have been ongoing for processing three-dimensional images for instructional purposes and medical applications. One area of particular interest stems from the medical imaging field for the treatments of patients to compare imaging scans of a patient taken before, during and after the treatments to assess the progress and effectiveness of the therapy or the degree of disease progression. Suitable medical image scanners to capture the image scans include x-ray, computerized tomography (CT), cone beam computerized tomography (CBCT), magnetic resonance imaging (MRI) and positron emission tomography (PET).

Medical imaging technology measured by both qualitative and quantitative analyses has continued to be developed with the availability of software applications and computing capabilities. Technical challenges in combining hundreds of sectional images of CT scan to produce a three-dimensional ("3D") image representation of a body organ have been hindered by some principal issues, such as conversion methodologies, surface color manipulation and insufficient image resolution.

It is therefore desirable to have methods and systems for qualitative and quantitative transformations on multiple datasets of sectional images into overlapping and delineated three-dimensional image representations.

SUMMARY

Embodiments of the present disclosure are directed to methods, computer systems, and computer program products for converting (or "transforming") multiple datasets into three-dimensional mesh surface visualization, displaying the mesh surface on a computer display, comparing two three-dimensional mesh surface structures by blending two different primary colors to create a secondary color, and computing the distance between two three-dimensional mesh surface structures converted from two similar datasets. In one example, the primary colors can be yellow for one surface mesh structure and blue for another, and the two colors are blended to create a secondary color green.

In a first embodiment with qualitative analysis, a three-dimensional structure comparison control engine includes a structure to three-dimensional mesh surface conversion module, and a color and translucency value assignment module. The structure to three-dimensional mesh surface conversion module is configured to convert datasets with a three-dimensional structure into three-dimensional surfaces with mesh surface visualization. The color and translucency value assignment module is configured to assign color and translucency value to the three-dimensional surface for the user conduct qualitative comparison analysis. The three-dimensional structure comparison control engine further includes an input module with an interaction component and a structure component, a structure storage and a display module with three-dimensional surface display component and a color and translucency to surface application module. Embodiments of the present methods are applicable to any field where segmented structures of the source and target volumes are available.

In a second embodiment with quantitative analysis, the three-dimensional structure comparison control engine includes a distance field computation, color to vertex assignment and shading module, and a structure to three-dimensional mesh surface conversion module. The distance field computation, color to vertex assignment and shading module is configured to compute the distance field between two closely-matched or similar datasets. The structure to three-dimensional mesh surface conversion module is configured to convert (or transform) the computed distance into corresponding color according to the color mapping scale, and display on a computer display. Embodiments of the present methods are applicable to any field where segmented structures of the source and target volumes are available. The three-dimensional structure comparison control engine include an input module with a interaction component and a structure selection component, a structure storage, and a display module with a structure as three-dimensional surface display component and a shading application component.

Broadly stated, a computer-implemented method for blending two three-dimensional volumetric structures, comprises associating a first primary color and a first translucency to a first dataset, and a second primary color and a second translucency to a second dataset, each of the first dataset and the second dataset having a respective three-dimensional surface representation; and blending the first and second datasets by visualizing the translucent surfaces of the first and second datasets to produce a blended representation of the first and second translucent surface datasets simultaneously, the blended representation including a first primary color, a second primary color, and a secondary color. In addition, a method for computing a first three-dimensional surface representation and a second three-dimensional surface representation, the first three-dimensional surface representation having a first set of sampling points, the second three-dimensional surface representation having a second set of sampling points, comprises computing the distance differential at the second set of sampling points of the second (red) three-dimensional surface representation from the first set of sampling points of the first (blue) three-dimensional surface representation, thereby generating a set of distance differential values between the first set of sampling points and the second set of sampling points, assigning a color coding scheme to the set of distance differential values, the color coding scheme having a continuous color range, and shading the surface of the second three-dimensional surface representation based on the color coding scheme that corresponds to the distance differential values.

The structures and methods of the present disclosure are disclosed in the detailed description below. This summary does not purport to define the invention. The invention is defined by the claims. These and other embodiments, features, aspects, and advantages of the invention will become better understood with regard to the following description, appended claims and accompanying drawings.

BRIEF DESCRIPTION OF THE DRAWINGS

The disclosure will be described with respect to specific embodiments thereof, and reference will be made to the drawings, in which:

FIG. 3 is a graphical diagram illustrating examples of primary, secondary and tertiary colors in accordance with the present disclosure.

FIGS. 8A-D depicts a first set of graphical diagrams with a two-dimensional greyscale image of horizontal/transverse human body slice section around the hip region, a two-dimensional greyscale image of coronal human body slice section; a two-dimensional greyscale image of sagittal human body slice section, and a three-dimensional image of the body structure as illustrated in FIGS. 8A-C with a slice section located at the bottom location of the body structure; FIGS. 8E-H depicts a second set of graphical diagrams with a two-dimensional greyscale image of horizontal/transverse human body slice section around the lower waist/upper hip region, a two-dimensional greyscale image of coronal human body slice section; a two-dimensional greyscale image of sagittal human body slice section, and a three-dimensional image of the body structure as illustrated in FIGS. 8E-G with a slice section located at the lower portion (lower waist/upper hip region) of the body structure; FIGS. 8M-P depicts a fourth set of graphical diagrams with a two-dimensional greyscale image of horizontal/transverse human body slice section around the upper waist region, a two-dimensional greyscale image of coronal human body slice section; a two-dimensional greyscale image of sagittal human body slice section, and a three-dimensional image of the body structure as illustrated in FIGS. 8M-O with a slice section located at the upper portion (upper waist region) of the body structure; and FIGS. 8Q-T depicts a fifth set of graphical diagrams with a two-dimensional greyscale image of horizontal/transverse human body slice section around the chest region, a two-dimensional greyscale image of coronal human body slice section; a two-dimensional greyscale image of sagittal human body slice section, and a three-dimensional image of the body structure as illustrated in FIGS. 8Q-S with a slice section located at the top (around the chest region) of the body structure.

FIG. 12 is an exploded view of a particular portion of the two closely-matched three-dimensional structure datasets as depicted in FIG. 11 in accordance with the present disclosure.

FIG. 13 is a graphical diagram illustrating the exploded view of iso-distance lines from shape A as depicted in FIG. 12 in accordance with the present disclosure.

FIG. 15A is a graphical diagram illustrating the color mapping scale of the computed distance values relative to a range of standard deviations in accordance with the present disclosure.

DETAILED DESCRIPTION

Figure 1:
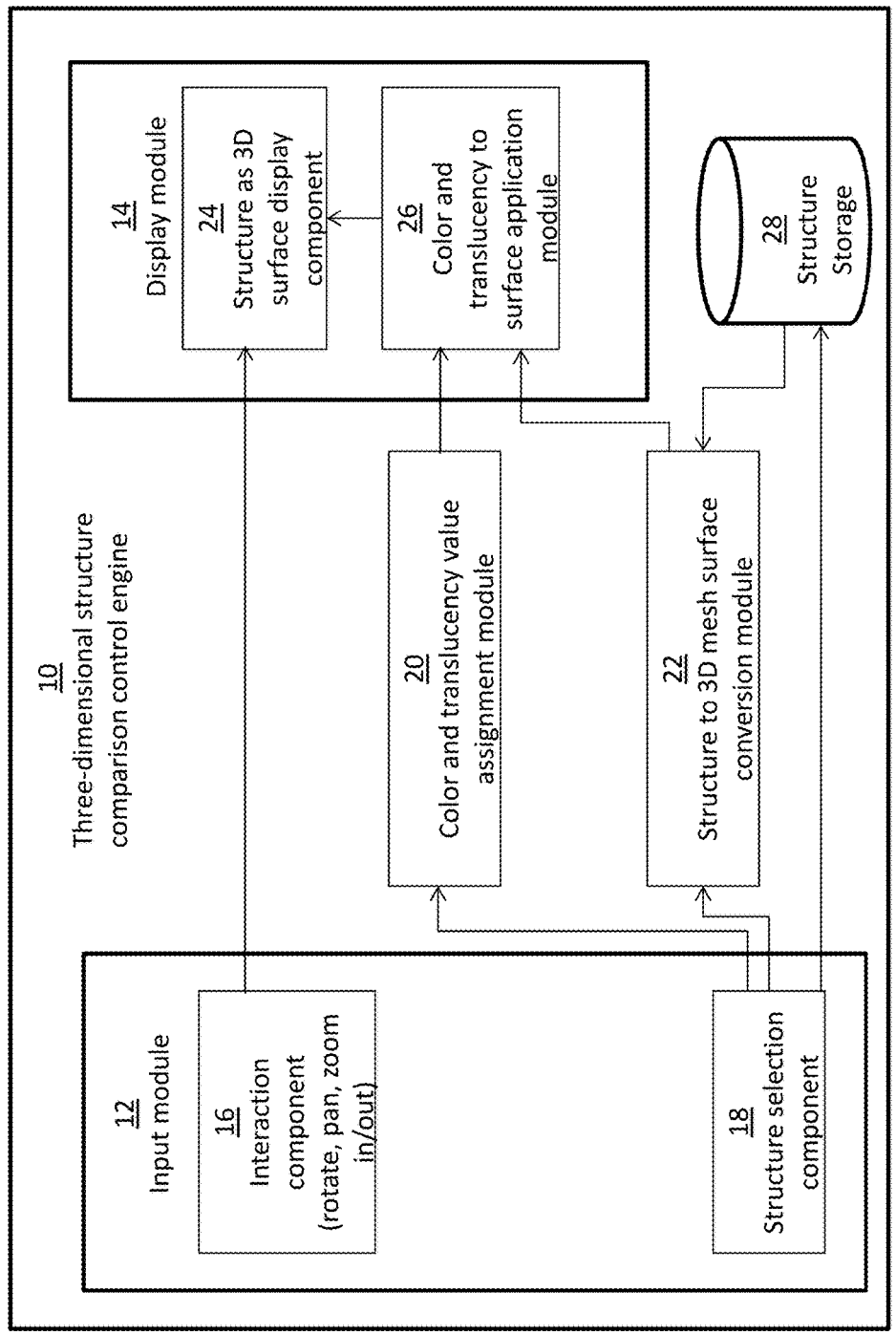
FIG. 1 is a software system diagram illustrating a first embodiment of a three-dimensional structure comparison control engine with a conversion module and an assignment module in accordance with the present disclosure.

A description of structural embodiments and methods of the present disclosure is provided with reference to FIGS. 1-16. It is to be understood that there is no intention to limit the disclosure to the specifically disclosed embodiments but that the disclosure may be practiced using other features, elements, methods, and embodiments. Like elements in various embodiments are commonly referred to with like reference numerals.

Qualitative Analysis

FIG. 1 is a software system diagram illustrating a first embodiment of the three-dimensional structure comparison control engine 10 that comprises an input module 12 and a display module 14, both of which are communicatively coupled to a color and translucency assignment module 20 and a structure to three-dimensional mesh surface conversion module 22. A structure storage 28 is further bidirectionally coupled to a structure selection component 18 of the input module 12 and the structure to three-dimensional mesh surface conversion module 22. The input module 12 further includes an interaction component 16 for rotating, panning, zooming in and zooming out functions. The display module 14 includes a structure as three-dimensional surface display component 14, and a color and translucency to surface application module 26. The color and translucency value assignment module 20 in the three-dimensional structure comparison control engine 10 is configured to assign color and translucency value to one or more datasets. The structure to three-dimensional mesh surface conversion module 22 is configured to convert multiple datasets into three-dimensional mesh surface visualization for display on a computer display. The term "translucent" or "translucency" refers to an image or a volumetric structure that is not completely transparent to allow light to pass through.

Figure 2:
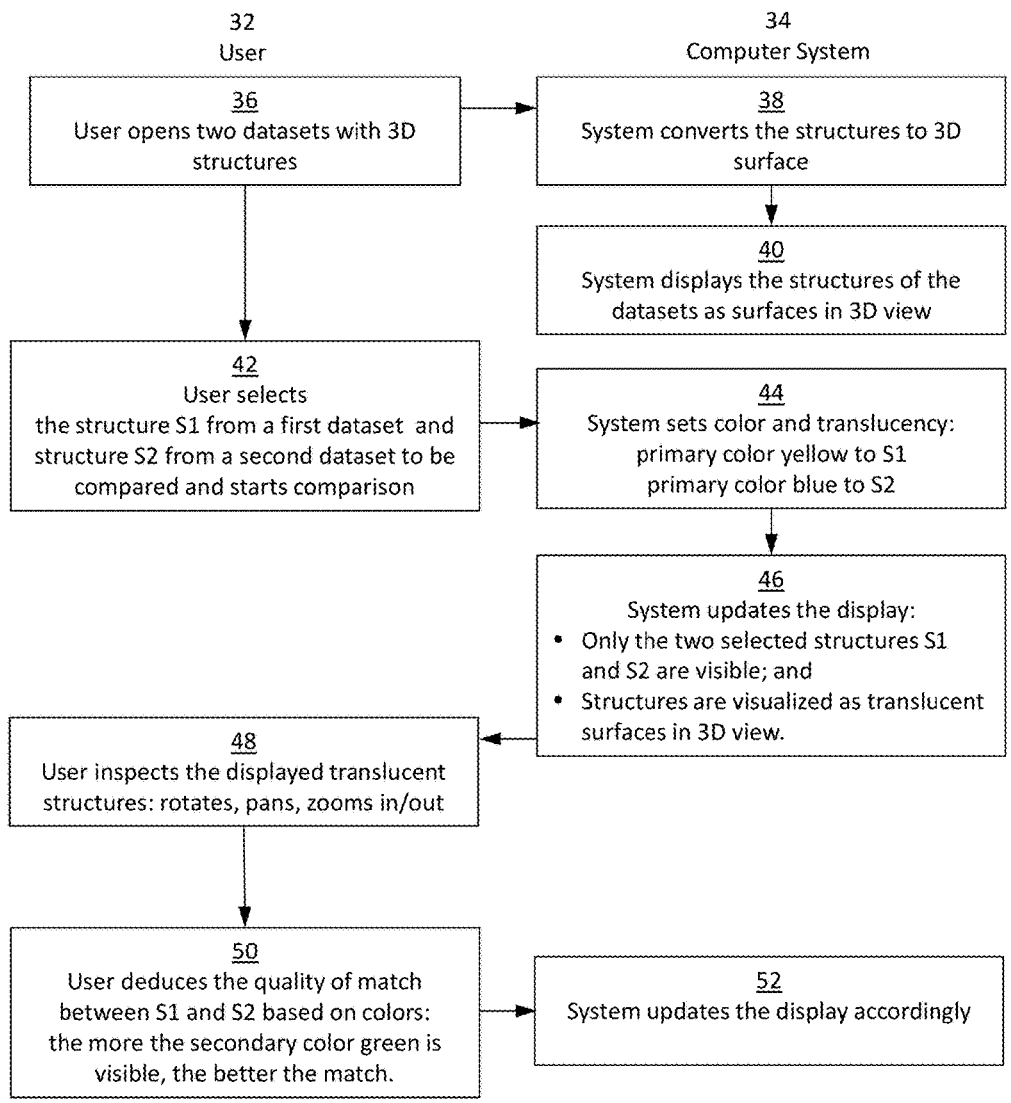
FIG. 2 is a block diagram depicting the process flow on the interactions between a user and a computer system in generating a blended three-dimensional structure from two datasets in accordance with the present disclosure.

FIG. 2 is a block diagram depicting the process flow 30 on the interactions between a user 32 and a computer system 34 in generating a blended three-dimensional structure from two datasets. At step 36, the user opens two datasets with three-dimensional structures. At step 38, the system 34 is configured to convert the two selected datasets with three-dimensional structure, received from the user 32, into three-dimensional structure view with mesh surface visualization. The three-dimensional structure view with mesh surface visualization is a system generated three-dimensional graphical representation of datasets. At step 40, the system 34 displays the three-dimensional structure view with mesh surface visualization on a computer display. After the user selects the structure S1 from a first dataset and structure S2 from a second dataset are selected and compared at step 42, the system 34 is configured to then set at step 44 the color and translucency, for example, such as a primary color yellow to structure S1 and a primary color blue to structure S2. At step 46, the system 34 updates the display, which only displays the selected structures S1 and S2 as translucent surfaces and visualized in a three-dimensional structure view. Once the display is updated, at step 48, the user 32 can inspect the translucent structures by rotating, zooming in, and panning the three-dimensional view. From the inspection, at step 50, the user 32 can deduce the quality of the matching characteristics by the degree of matching between structure S1 and structure S2, as illustrated in the visualization of a secondary color.

FIG. 3 is a graphical diagram 54 illustrating one embodiment on the possible primary colors 56 and secondary colors 58 that can be used for the three-dimensional mesh structures. In this example, the primary colors 56 are pigment colors that cannot be mixed or formed by any combination of other colors. The three primary colors 56 compose of red, yellow, and blue. All other colors are derived from these three hues. The secondary colors 58, in this example, such as green, orange, and purple, are colors that can be formed by mixing the primary colors. Optionally, tertiary colors 60 can also be formed by mixing a primary color and secondary color, resulting in colors such as blue-green, red-purple, or yellow green.

Figure 4:
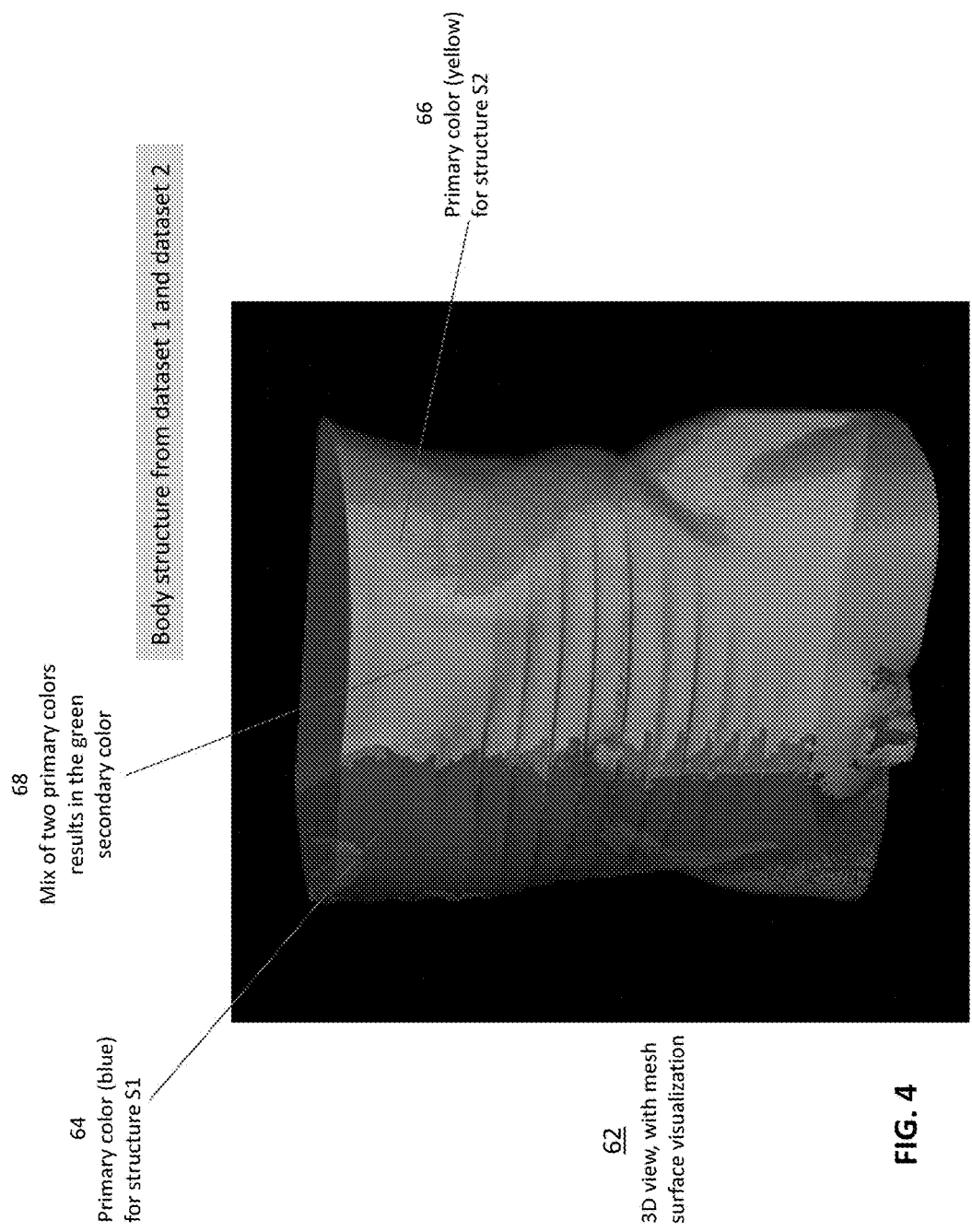
FIG. 4 depicts one graphical illustration of a three-dimensional body structure view with mesh surface visualization from two datasets as generated by the three-dimensional structure comparison control engine in accordance with the present disclosure.
Figure 5:
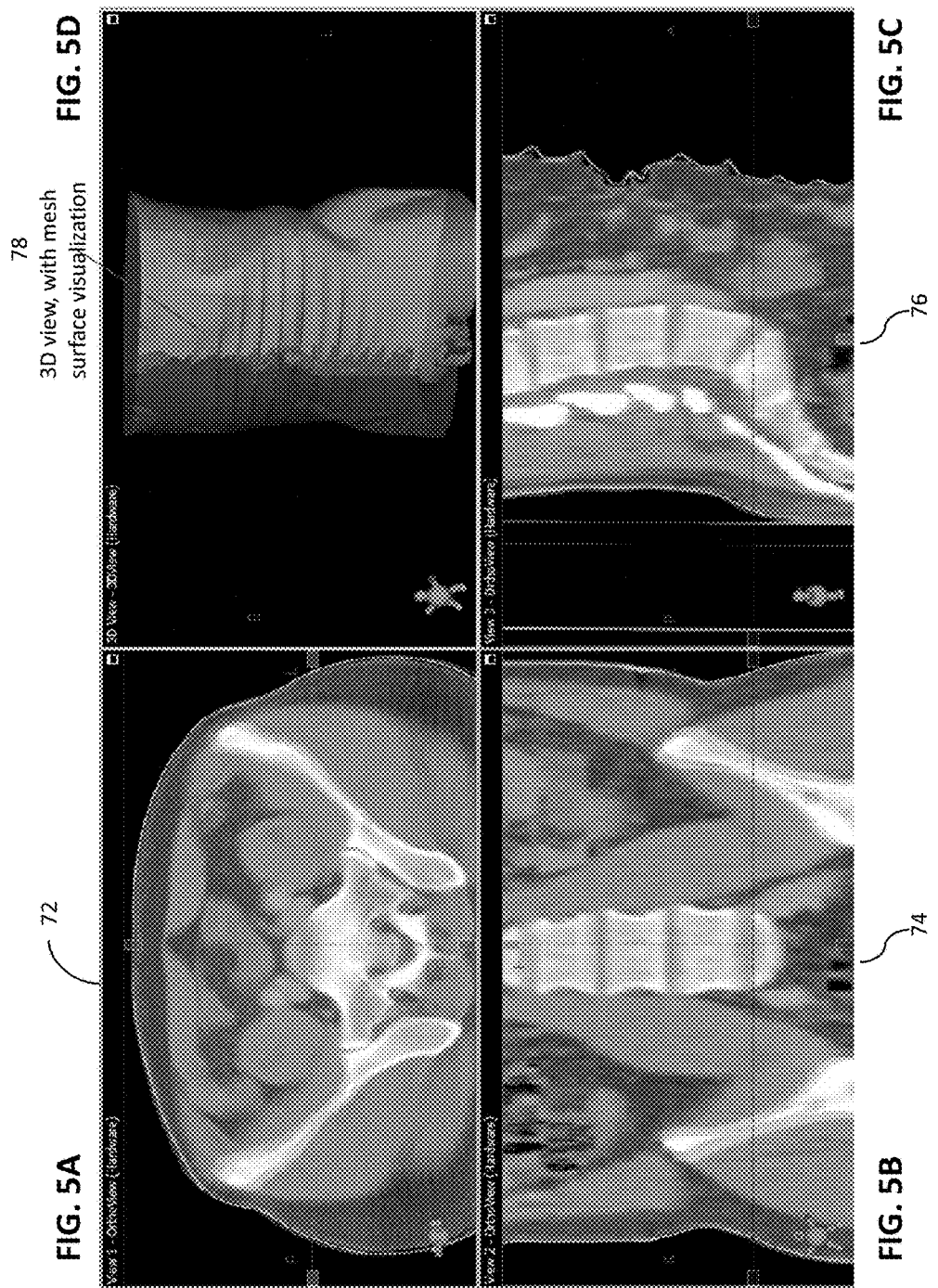
FIG. 5A is a graphical diagram illustrating a two-dimensional greyscale image of a horizontal/transverse human body slice section in accordance with the present disclosure.
FIG. 5B is a graphical diagram illustrating a two-dimensional greyscale image of a coronal human body slice section in accordance with the present disclosure.
FIG. 5C is a graphical diagram illustrating a two-dimensional greyscale image of a sagittal human body slice section in accordance with the present disclosure.
FIG. 5D is a graphical diagram illustrating a three-dimensional view with mesh surface visualization in accordance with the present disclosure.

FIG. 4 depicts one graphical illustration 62 of a three-dimensional body structure view with mesh surface visualization from two datasets as generated by the three-dimensional structure comparison control engine 10. The three-dimensional structure comparison control engine 10 is configured to generate a first three-dimensional structure S1 64 from a first dataset which is show in a primary color blue. The three-dimensional structure comparison control engine 10 is configured to generate a second three-dimensional structure S2 66 from a second dataset which is show in a primary color yellow. The mixture of the two three-dimensional structures S1 and S2 with primary colors of blue and yellow, where the overlapping areas are blended and shown in a secondary color green 68.

FIGS. 5A-D illustrates the different image slices and contours which can be compiled and computed to generate a three-dimensional structure view with mesh surface visualization. A slice (or "slice section" or "image slice") refers to the two-dimensional section images from an imaging device such as MRI or CT scan. FIG. 5A is a two-dimensional greyscale image of horizontal transverse human body slice 72. FIG. 5B is a two-dimensional greyscale image of coronal human body slice 74. FIG. 5C is a two-dimensional greyscale image of sagittal human body slice 76. FIG. 5D is an embodiment of the three-dimensional structure 78 view with mesh surface visualization comprising of the dataset from FIGS. 5A-C.

Figure 6:
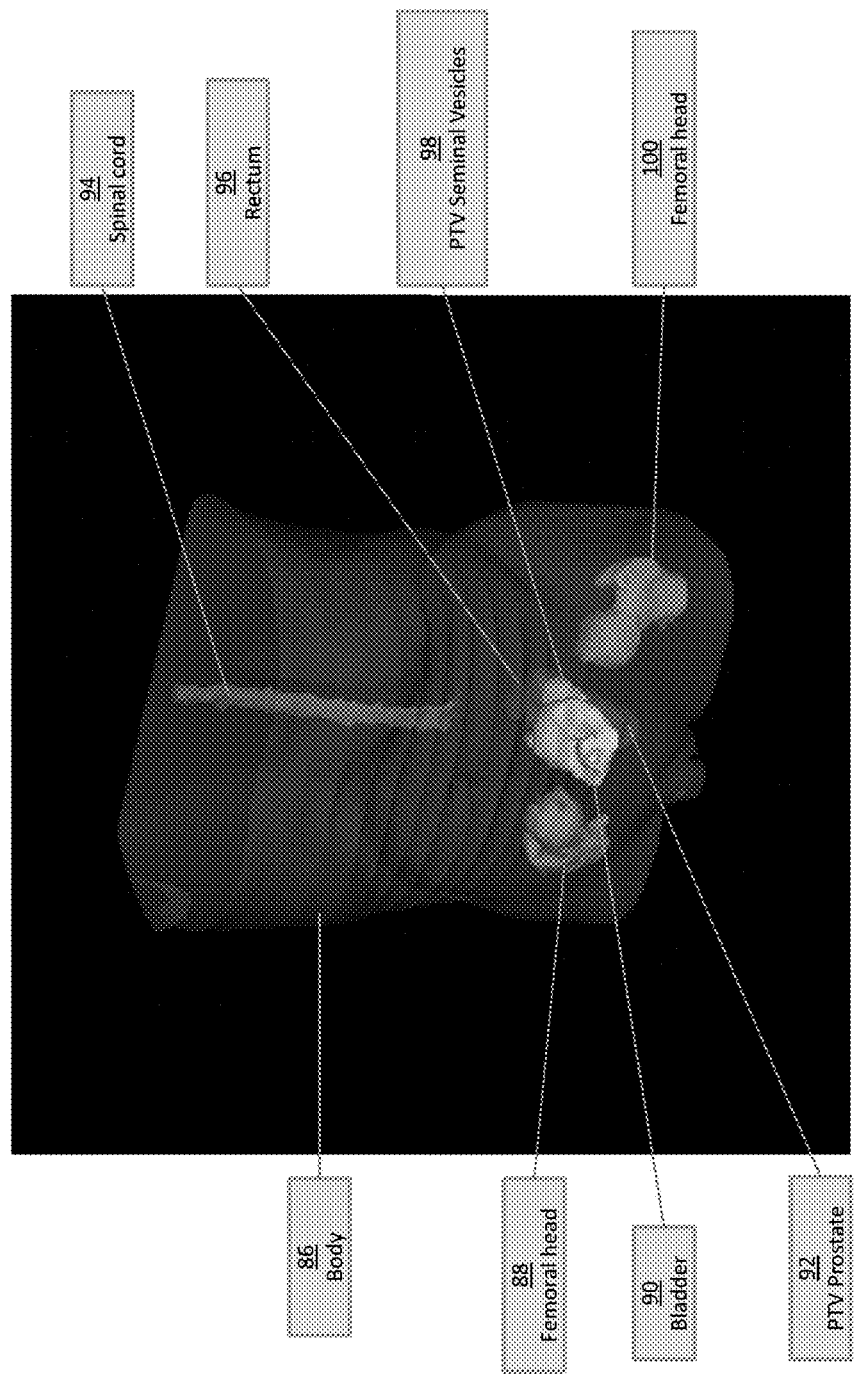
FIG. 6 is a graphical diagram illustrating a three-dimensional image illustrating the body structure with mesh surface visualization of various organs in three-dimensional representations in accordance with the present disclosure.
Figure 7A:
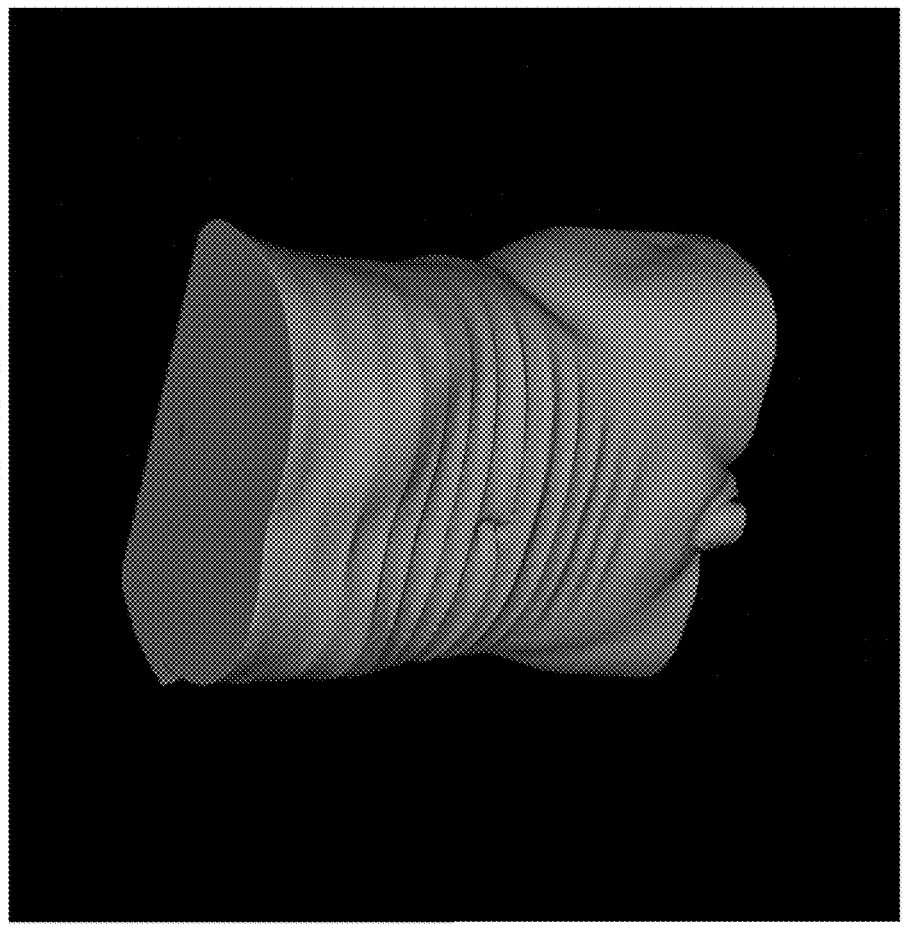
FIGS. 7A-D are graphical diagrams illustrating three-dimensional images of the body structure with mesh surface visualization with respective opacity of 100%, 75%, 50% and 25% in accordance with the present disclosure.
Figure 7B:
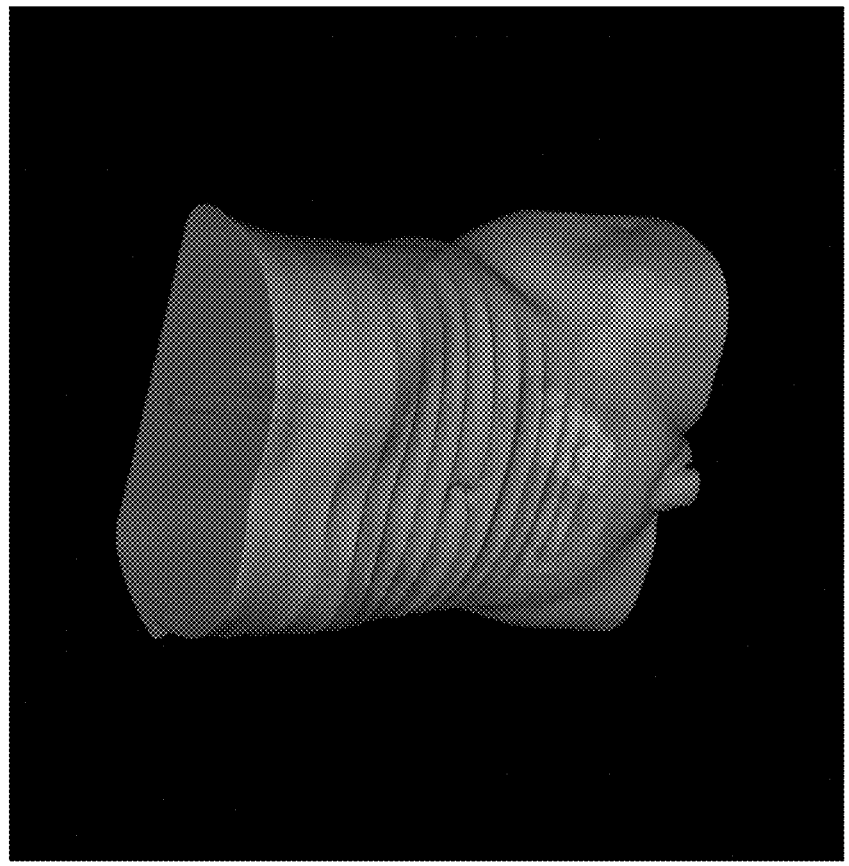
Figure 7C:
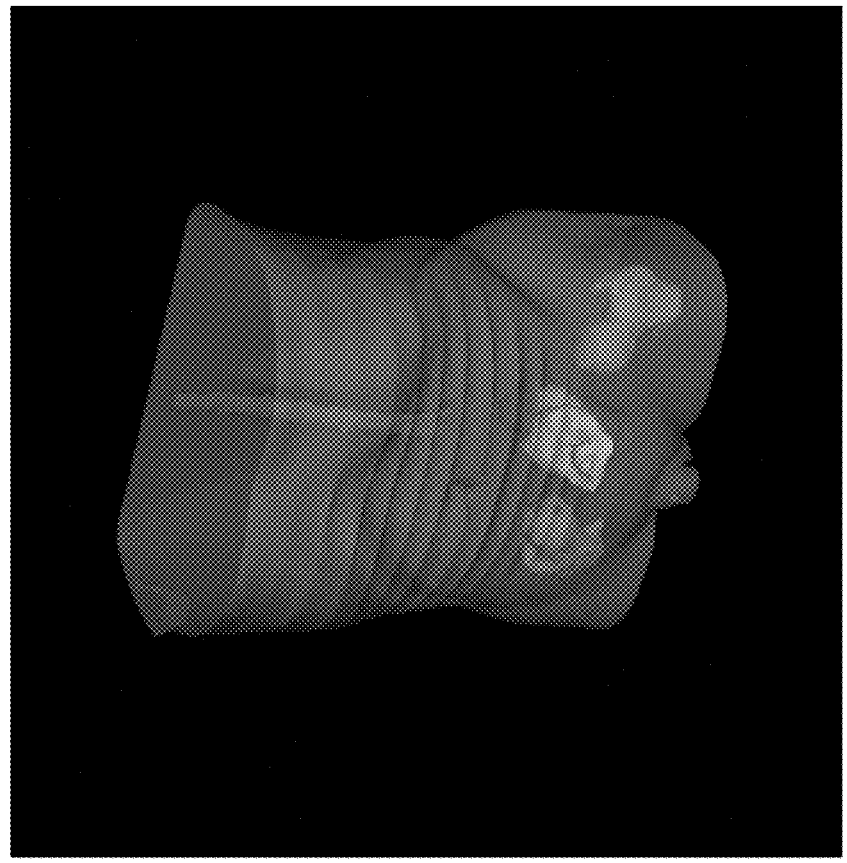
Figure 7D:
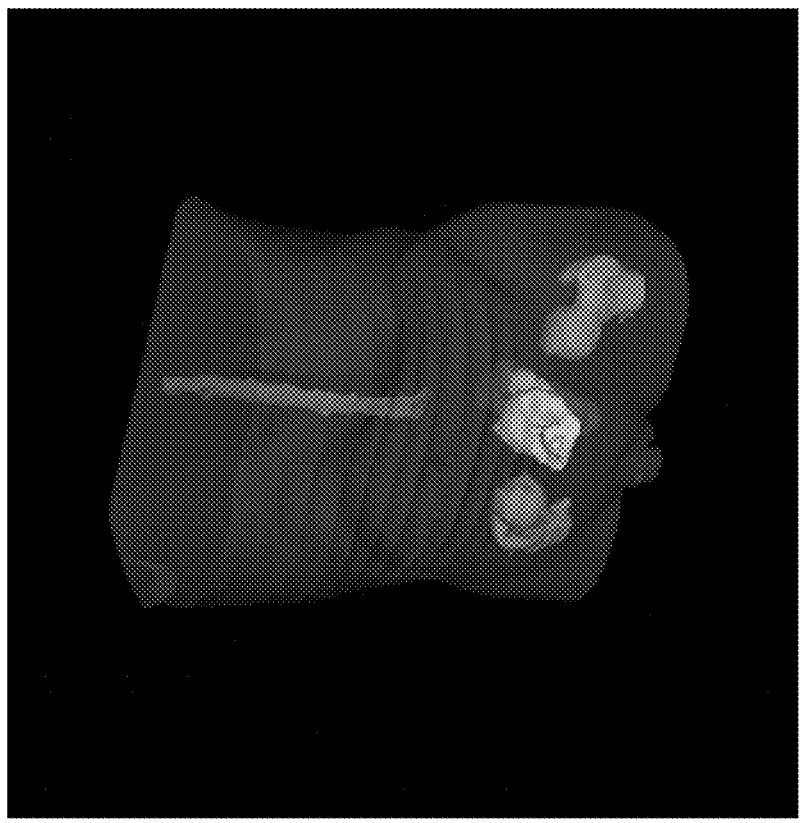

FIG. 6 depicts a three-dimensional image diagram 84 of the different human internal organs and regions that can be visualized on a computer display by the three-dimensional structure comparison control engine 10 in generating a three-dimensional image with mesh surface visualization. Each organ is illustrated using different designated colors to differentiate from the various organs, which in this figure shows the right femoral head 88, a bladder 90, a PTV prostate 92, a spinal cord 94, a rectum 96, a PVT seminal vesicles 98, and the left femoral head 100 can be identified. With the proper datasets and selection of color scheme, the three-dimensional structure comparison control engine 10 is capable of displaying various organs from the body 86.

FIG. 7A-D illustrates the effects of different respective opacity/translucency level settings of 100%, 75%, 50%, and 25% on the visualization of three-dimensional structure view with mesh surface. As opacity decreased from level of 100% 102, 75% 104, 50% 106, and to 25% 108, there is a corresponding proportional increase in the visibility and more distinctions with the other internal three-dimensional mesh surfaces. The three-dimensional structure comparison control engine 10 is configured to manipulate the opacity/translucency setting and to control the three-dimensional mesh surface visualization of a desirable dataset for display.

Figure 8I:
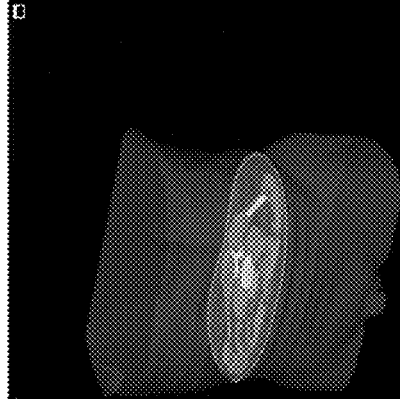
FIGS. 8I-L depicts a third set of graphical diagrams with a two-dimensional greyscale image of horizontal/transverse human body slice section around the waist region, a two-dimensional greyscale image of coronal human body slice section; a two-dimensional greyscale image of sagittal human body slice section, and a three-dimensional image of the body structure as illustrated in FIGS. 8I-K with a slice section located at the mid portion (around the waist region) of the body structure.

FIGS. 8A-T are five sets of graphical diagrams that provide an illustration for constructing a three-dimensional mesh structure visualization from two-dimensional slices. The actual implementation of the three-dimensional mesh structure visualization comprises a large number of slices (for example, hundreds of slices) to construct a three-dimensional mesh surface structure. In this example, the five sets of slices depict a bottom slice 118, a lower bottom (or "lower quarter") slice 130, a mid-section slice 142, an upper portion slice 154, and a top slice 166 in FIGS. 8A-D, FIGS. 8E-H, FIGS. 8I-L, FIGS. 8M-P, and FIGS. 8Q-T.

FIGS. 8A-D depicts a first set 118 of graphical diagrams with a two-dimensional greyscale image with body contour (body contour outline) of horizontal/transverse human body slice section around the hip region 120 in FIG. 8A, a two-dimensional greyscale image with body contour (body contour outline) of coronal human body slice section 122 in FIG. 8B, and a two-dimensional greyscale image with body contour (body contour outline) of sagittal human body slice section 124 in FIG. 8C. A three-dimensional image of the body structure 126 as illustrated in FIG. 8D from the figures with respect to the 8A-C to produce a slice section located at the bottom location of the body structure.

FIGS. 8E-H depicts a second set 130 of graphical diagrams with a two-dimensional greyscale image with body contour (body contour outline) of horizontal/transverse human body slice section around the lower waist/upper hip region 132 in FIG. 8E, a two-dimensional greyscale image with body contour (body contour outline) of coronal human body slice section 134 in FIG. 8F, a two-dimensional greyscale image with body contour (body contour outline) of sagittal human body slice section 136 in FIG. 8G. A three-dimensional image of the body structure 136 as illustrated in FIG. 8H from the figures with respect to the 8E-G to produce a slice section located at the lower quarter portion (lower waist/upper hip region) of the body structure.

Figure 8J:
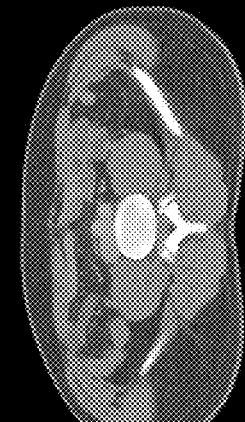
Figure 8K:
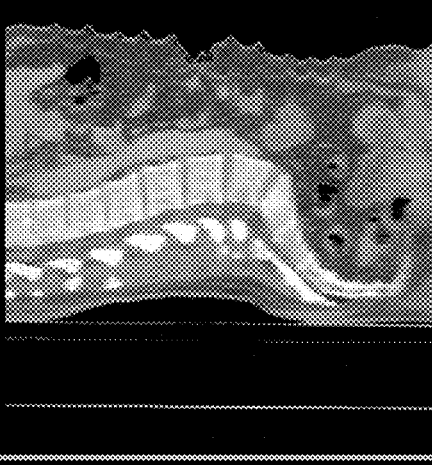
Figure 8L:
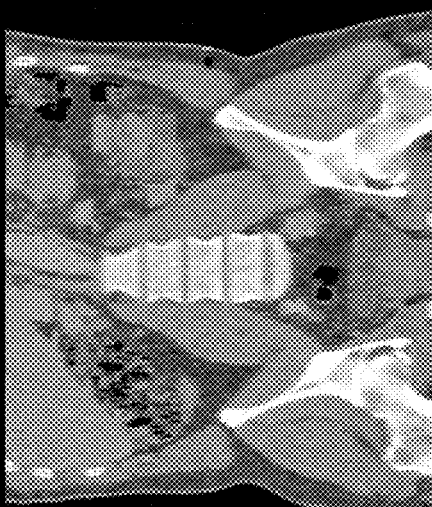

FIGS. 8I-L depicts a third set 142 of graphical diagrams with a two-dimensional greyscale image with body contour (body contour outline) of horizontal/transverse human body slice section around the waist region 144 in FIG. 8I, a two-dimensional greyscale image with body contour (body contour outline) of coronal human body slice section 146 in FIG. 8J, and a two-dimensional greyscale image with body contour (body contour outline) of sagittal human body slice section 148 in FIG. 8K. A three-dimensional image of the body structure 150 as illustrated in FIG. 8L from the figures with respect to the 8E-G to produce a slice section located at the mid portion (around the waist region) of the body structure.

FIGS. 8M-P depicts a fourth set 154 of graphical diagrams with a two-dimensional greyscale image with body contour (body contour outline) of horizontal/transverse human body slice section around the upper waist region 156 in FIG. 8M, a two-dimensional greyscale image with body contour (body contour outline) of coronal human body slice section 158 in FIG. 8N, and a two-dimensional greyscale image with body contour (body contour outline) of sagittal human body slice section 160 in FIG. 8O. A three-dimensional image of the body structure 162 as illustrated in FIG. 8P from the figures with respect to the 8E-G to produce a slice section located at the upper portion (upper waist region) of the body structure.

FIGS. 8Q-T depicts a fifth set 166 of graphical diagrams with a two-dimensional greyscale image with body contour (body contour outline) of horizontal/transverse human body slice section around the chest region 168 in FIG. 8Q, a two-dimensional greyscale image with body contour (body contour outline) of coronal human body slice section 170 in FIG. 8R, and a two-dimensional greyscale image with body contour (body contour outline) of sagittal human body slice section 172 in FIG. 8S. A three-dimensional image of the body structure 174 as illustrated in FIG. 8T from the figures with respect to the 8Q-S to produce a slice section located at the top (around the chest region) of the body structure.

Qualitative and Quantitative Analysis

Figure 9:
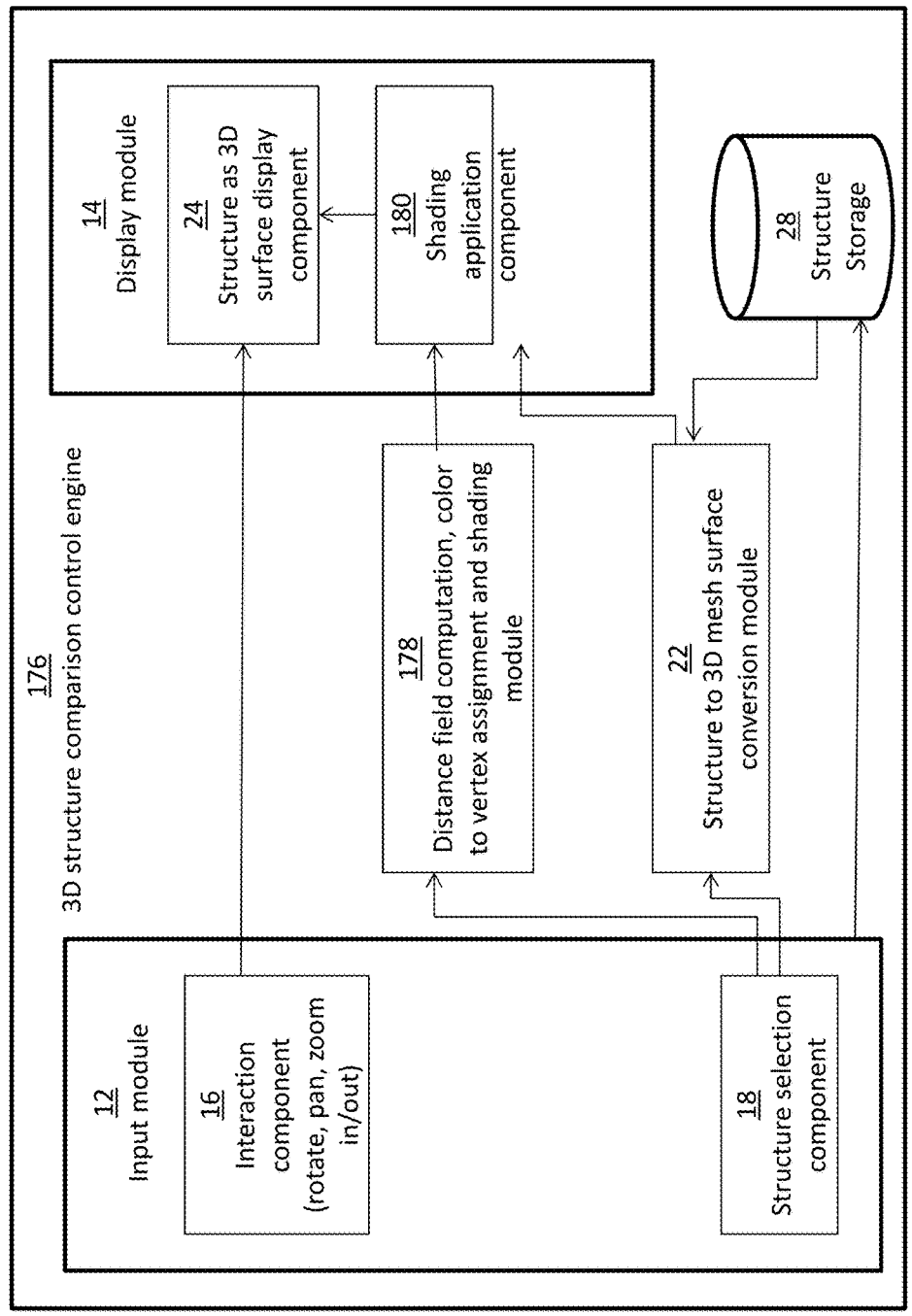
FIG. 9 is a software system diagram illustrating a second embodiment of a three-dimensional structure comparison control engine for determining distance value, color to vertex value, and shading value in accordance with the present disclosure.

FIG. 9 is a software system diagram illustrating a second embodiment of the three-dimensional structure comparison control engine 176 that comprises an input module 12 and a display module 14, both of which are communicatively coupled to a distance field computation, color to vertex assignment, and shading module 178 and a structure to three-dimensional mesh surface conversion module 22. A structure storage 28 is further bidirectionally coupled to a structure selection component 18 of the input module 12 and the structure to three-dimensional mesh surface conversion module 22. The input module 12 further includes an interaction component 16 for rotating, panning, zooming in and zooming out functions. The display module 14 includes a structure as three-dimensional surface display component 14, and a shading application component 180. The distance field computation, color to vertex assignment and shading module 178 is configured to determine distance value, color to vertex value, and shading value of the datasets with three-dimensional structure. The structure to three-dimensional mesh surface conversion module 22 is configured to convert multiple datasets into three-dimensional mesh surface visualization for display on a computer display.

Figure 10:
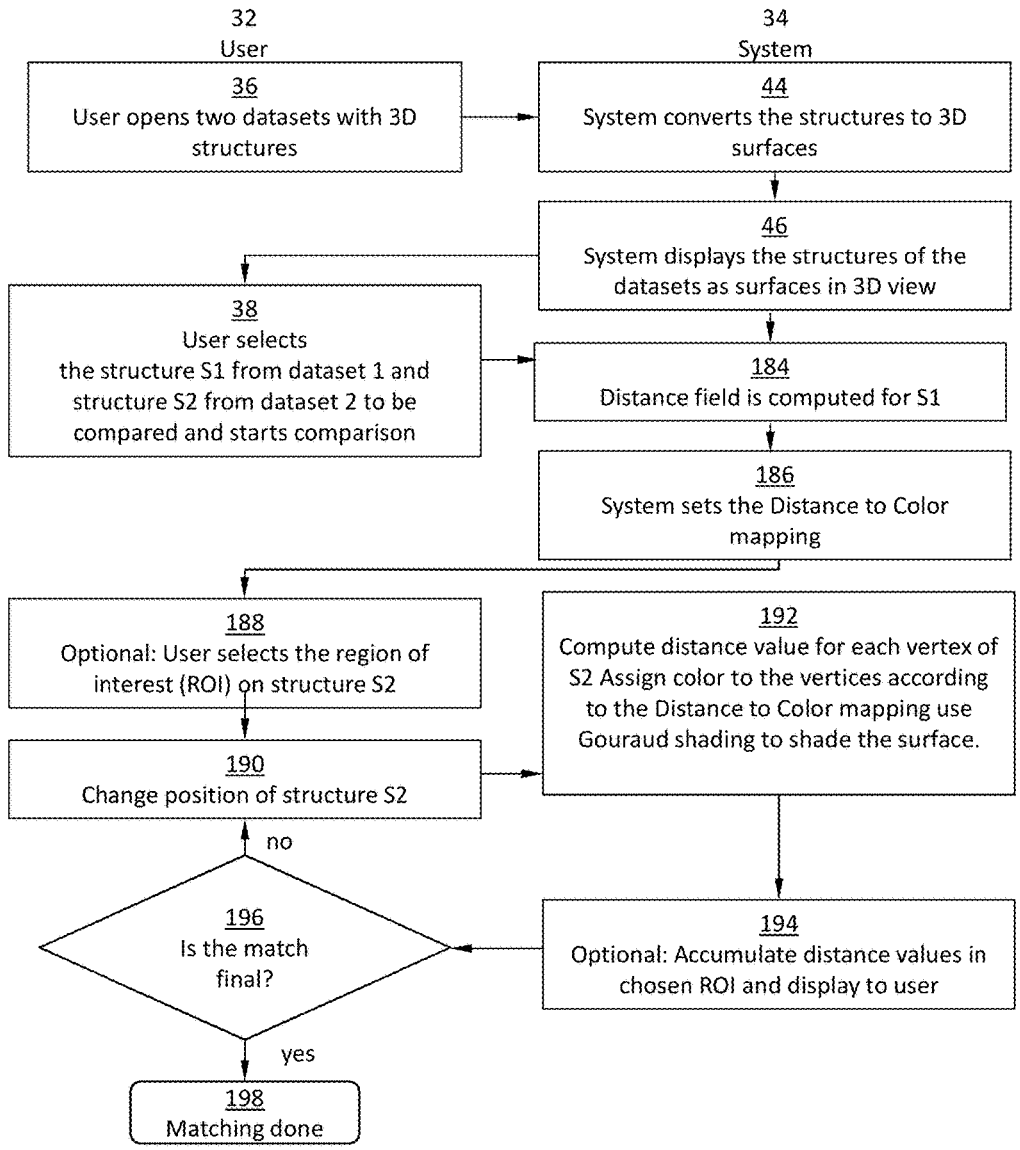
FIG. 10 is a flow diagram illustrating the process of interactions between a user and a computer system for qualitative and quantitative analysis of two datasets with three-dimensional structures in accordance with the present disclosure.

FIG. 10 is a block diagram depicting the stepwise flow and method according to one or more embodiments of the present disclosure. At step 32, the user opens two datasets with three-dimensional structures. At step 44, the computer system is configured to transform or convert 44 the two selected datasets with three-dimensional structure into three-dimensional structure view with mesh surface visualization. At step 46, the system displays the three-dimensional structure view with mesh surface visualization on a computer display. After the structure S1 from dataset 1 and structure S2 from dataset 2 are selected 38 and compared, the system computes the distance field values for S1 at step 184 and sets the distance to color mapping at step 186. Optionally, the user selects a region of interest (ROI) on structure S2 at step 188 and change the position of structure S2 at step 190. At step 192, the computer system 34 is configured to then compute the distance value for each vertex of structure S2 and assign color according to the distance to color mapping scale. At step 194, the control engine 176 is configured accumulate distance values in the chosen region of interest and display to users on a computer display. Once the system displays the results, at step 196, the user can then determine whether the quality and finality of the matching. If the user is satisfied with the match, the process 182 returns to step 190 to change the position of structure. If the user is satisfied, the process is completed at step 198. In some embodiments, the three-dimensional structure comparison control engine 176 is configured to use Gouraud shading to indicate the distance according to the distance to color mapping. The gouraud shading is an interpolation method used in computer graphics to produce continuous shading of surfaces represented by polygon meshes, to shade the mesh surface of three-dimensional structure view on a computer display and to visualize the distance between two surfaces based on color.

Figure 11:
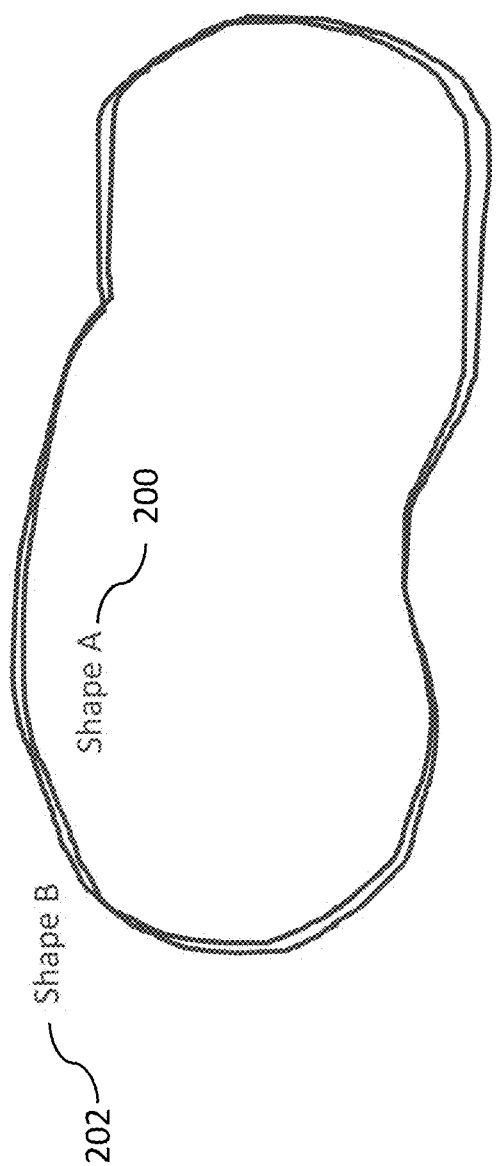
FIG. 11 is a graphical diagram illustrating two-dimensional surface representation of the first and second shapes from two closely-matched three-dimensional structure datasets in accordance with the present disclosure.

FIG. 11 illustrates the two-dimensional surface representation of two closely-matched (or similarly matched) datasets for comparison. The shape A blue line 200 represents the contour of a first dataset and the shape B red line 202 represent the contour of a second dataset. An exploded view 206 for a particular region 208 of the shape A 200 and the shape B 202 as illustrated in FIG. 12 provides the differentials between a curve 201 associated with the shape A 200 and a curve 212 associated with the shape B 202 of the two closely-matched datasets. In some embodiments, the three-dimensional structure comparison control engine 176 is configured to compute Iso-distance lines 216 associated with the shape A to provide a geometric relationship with the curve 12 associated with the shape B 202, as shown in FIG. 13. A distance field is a voxel grid containing the subject shape (e.g. Shape A in FIG. 14C), where each voxel is labeled with the distance to the nearest point on the surface of the subject shape.

Figure 14A:
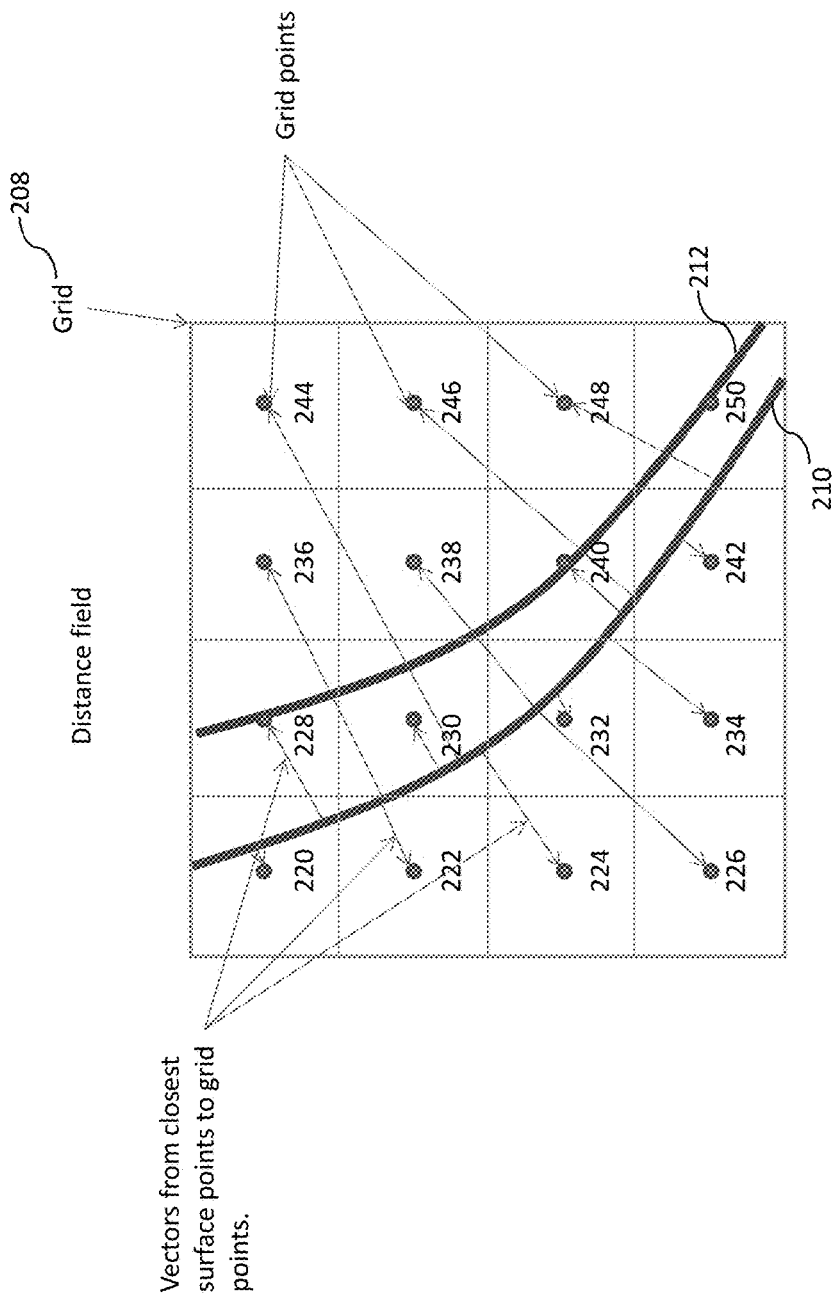
FIG. 14A is a graphical diagram illustrating a distance field map with distance computation and vectors of the closest surface points from shape A relative to the grid points in accordance with the present disclosure.
Figure 14B:
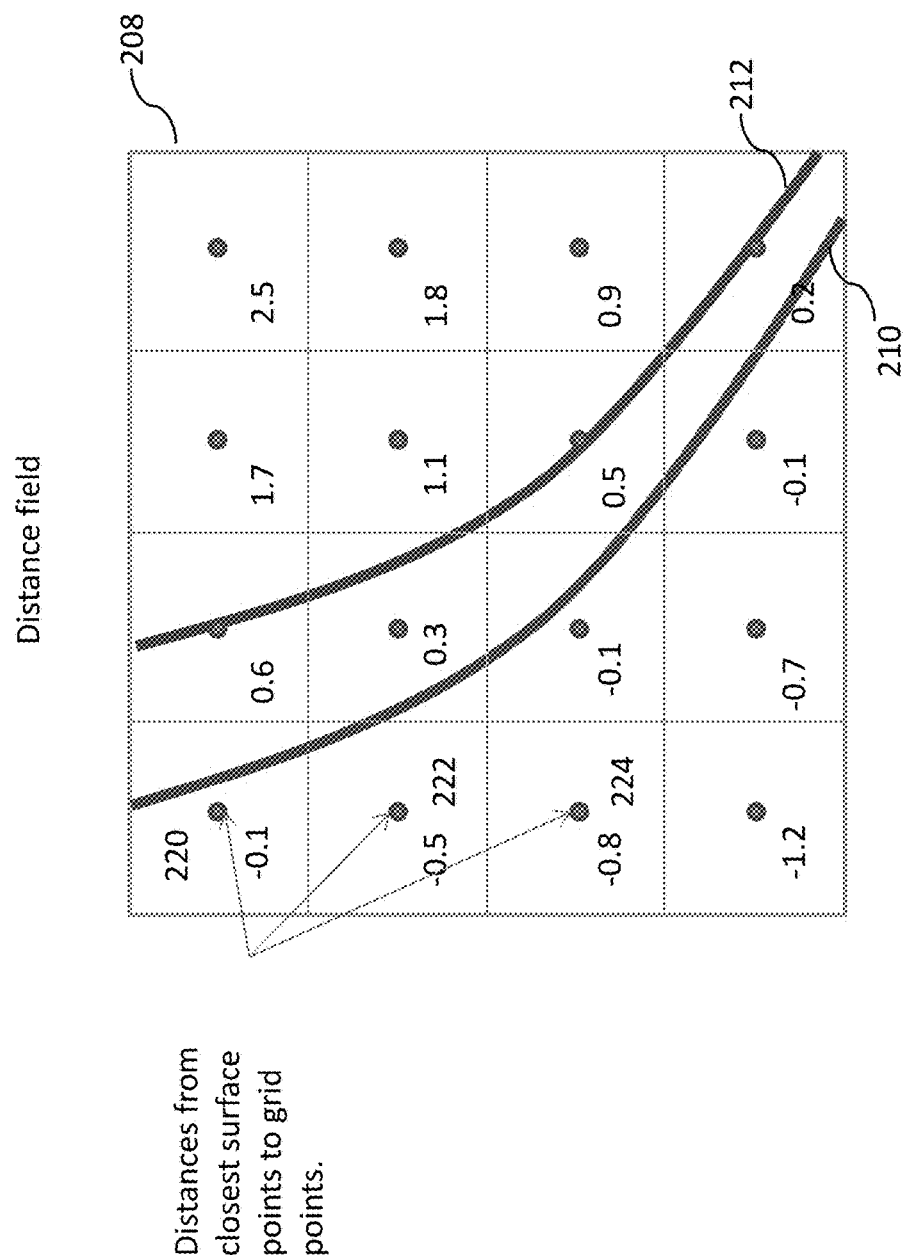
FIG. 14B is a graphical diagram showing the computation of the vector values of the distance from the closest surface point of shape A to the grid points with respect to FIG. 14A in accordance with the present disclosure.

FIG. 14A is a graphical diagram illustrating distance field computation with vectors from closes surface points to gird points on the grid 208. In this example, the grid 208 includes sixteen identical-sized grid boxes in which a respective grid point 220, 222, 224, 226, 228, 230, 232, 234, 236, 238, 240, 242 244, 246, 248, and 250 is located at the center of each grid box. The three-dimensional structure comparison control engine 176 is configured to calculate vector values from the closest surface point of shape A 210 to one of the respective grid points 220, 222, 224, 226, 228, 230, 232, 234, 236, 238, 240, 242 244, 246, 248, and 250. The resulting distance field values on the unit value of the distance from the closest surface point of shape A to grid points is shown in FIG. 14B. In this illustration, the distance values from the closest surface points to the grid points has a computed value of −0.1 between the grid point 220 to the curve 210, a computed value of −0.5 between the grid point 222 to the curve 210, and a computed value of −0.8 between the grid point 224 to the curve 210.

Figure 14C:
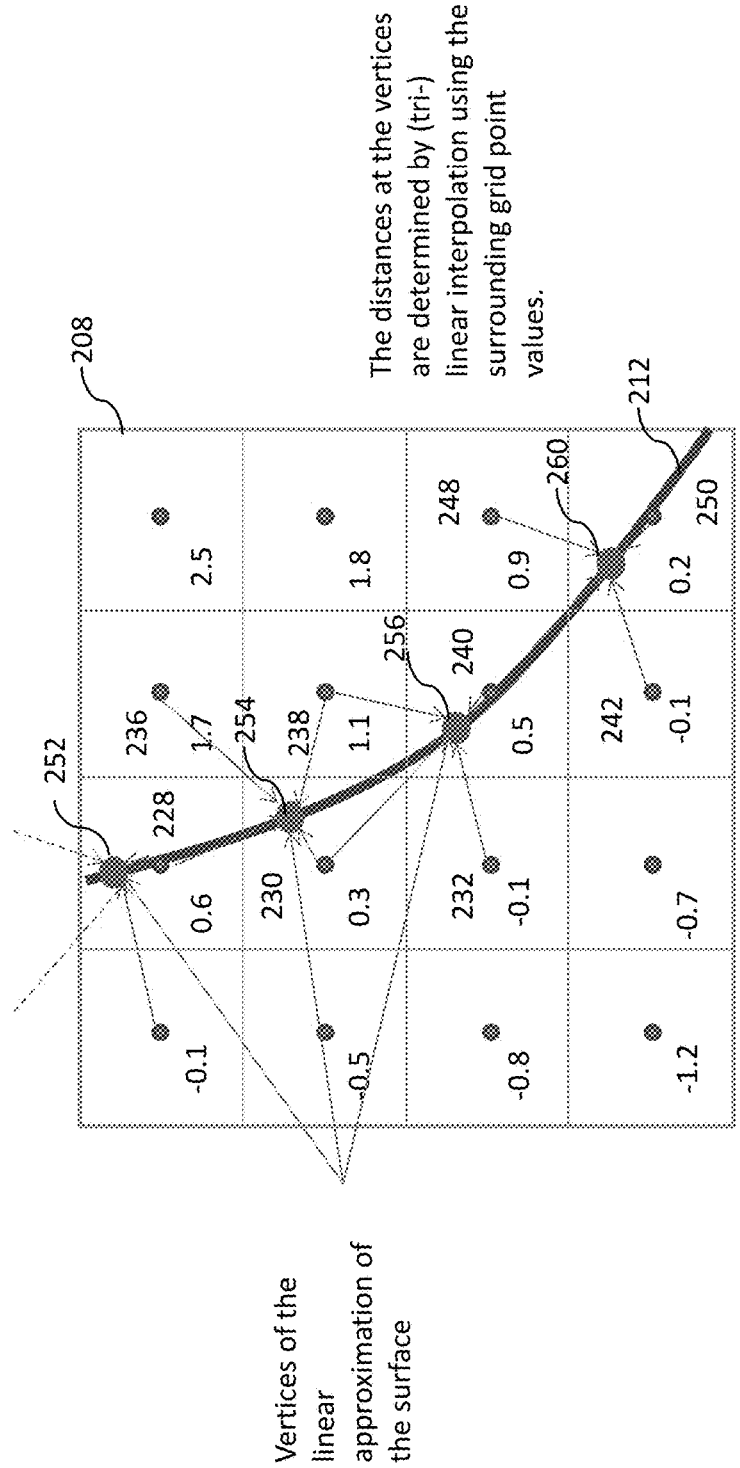
FIG. 14C is a graphical diagram illustrating the computation of linear interpolation on the distance value for the vertices in shape B in accordance with the present disclosure.
Figure 14D:
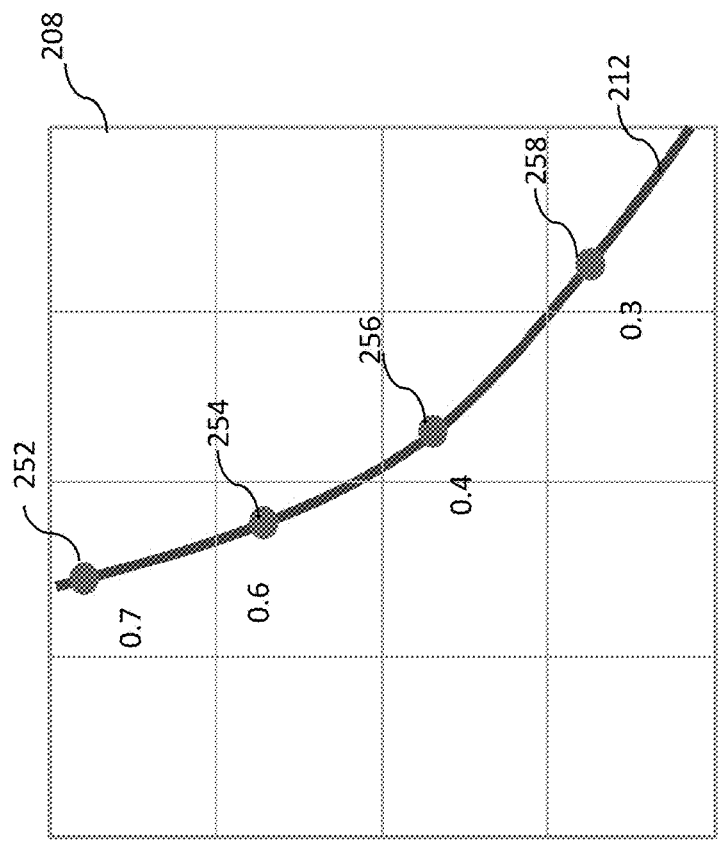
FIG. 14D is a graphical diagram showing the computed and interpolated distance value for the vertices in shape B in accordance with the present disclosure.

The distance value at the vertices 252, 254, 256, 258, in the shape B, can be computed by (multi-point linear or tri-linear) linear interpolation using the surrounding grid point values, as shown in FIG. 14C. The distance value of the shape B vertex 256 is computed by linear interpolation using the four neighboring grid point values of 0.3 from grid point 230, −0.1 from the grid point 232, 1.1 from the grid point 238, and 0.5 from the grid point 240. The computed and interpolated distance value for the vertices 252, 254, 256, 258 in the shape B is shown in FIG. 14D. The shape B vertices 252, 254, 256, 258 has respective interpolated distance values of 0.7, 0.6, 0.4 and 0.3.

Figure 15B:
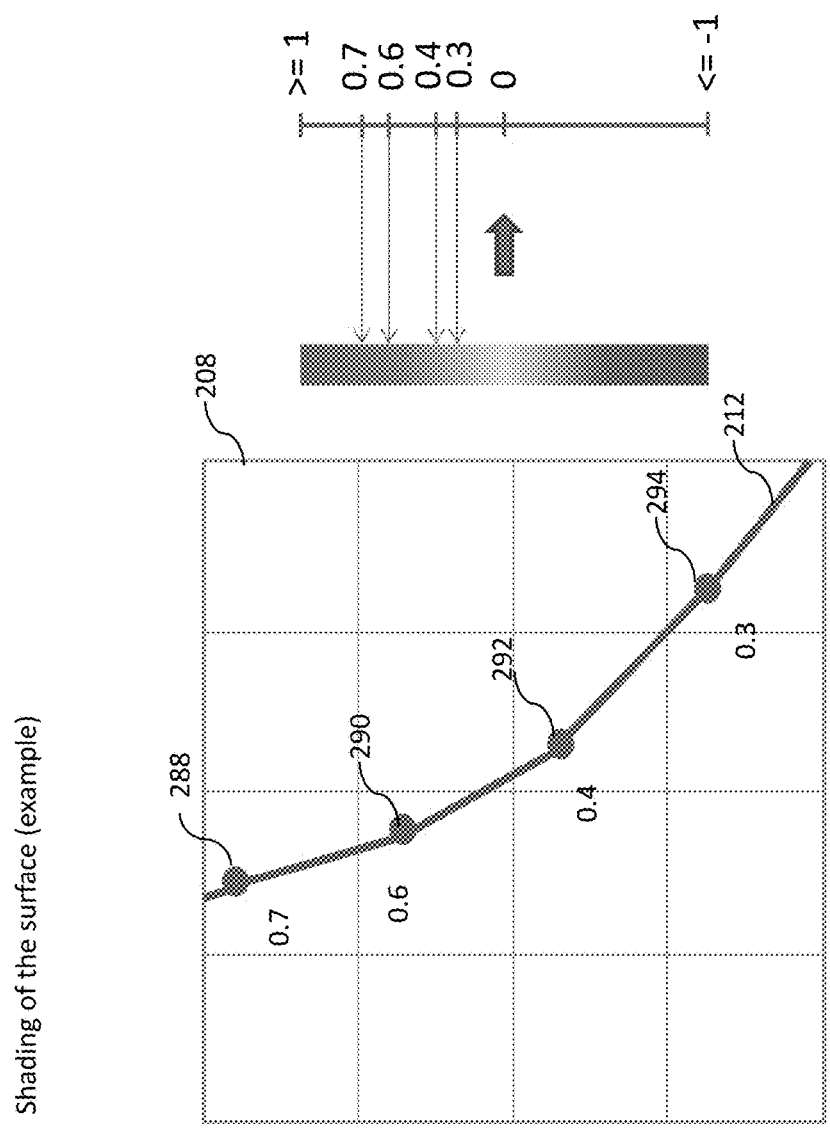
FIG. 15B is a graphical diagram illustrating the conversion method on the values of the computed vertices in shape B that correspond to a specific color on the color mapping scale in accordance with the present disclosure.
Figure 15C:
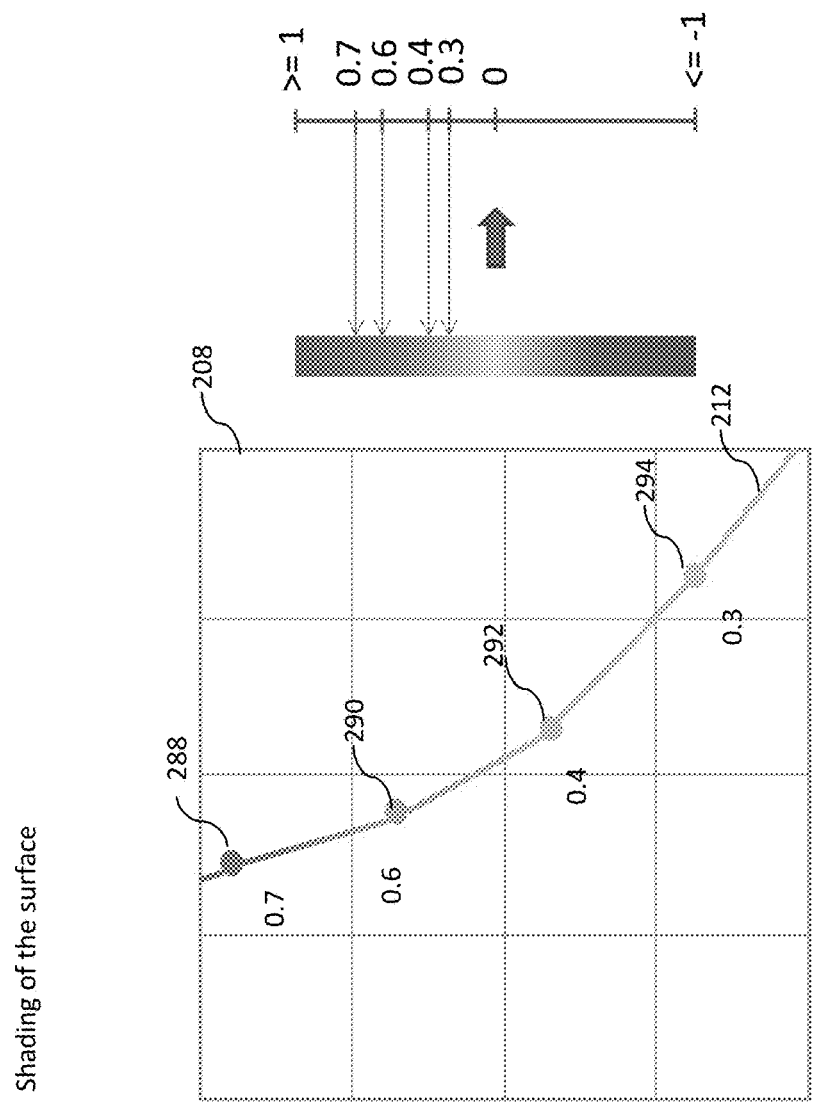
FIG. 15C is a graphical diagram illustrating the converted shading colors on the surfaces and vertices of shape B with respect to FIG. 15B in accordance with the present disclosure.

FIG. 15A is an example of color mapping scale of the computed distance values relative to a range of standard deviations, for the shape B vertices. The interval of the scale in the current embodiment, which contains 95% of all values, is set to ±2δ where δ is the standard deviation of all signed distance valued. FIG. 15B illustrates the relative color that each of the distance value of shape B vertices translates to on the color mapping scale. On the color mapping scale shown, a value of 0 translates into yellow, a value of 0.3 translates into orange, and a value of 1 translates into red. As shown in FIG. 15C, the control engine 176 can convert the shading of shape B surface and vertices to the corresponding colors on the mapping scale, according to the computed distance value of the vertices.

Some portions of the above description describe the embodiments in terms of algorithmic descriptions and processes, e.g., as with the description within FIGS. 1-16. These operations (e.g., the processes described above), while described functionally, computationally, or logically, are understood to be implemented by computer programs or equivalent electrical circuits, microcode, or the like. The computer programs are typically embedded as instructions that can be stored on a tangible computer readable storage medium (e.g., flash drive disk, or memory) and are executable by a processor, for example, as described in FIGS. 1-16. Furthermore, it has also proven convenient at times, to refer to these arrangements of operations as modules, without loss of generality. The described operations and their associated modules may be embodied in software, firmware, hardware, or any combinations thereof.

Figure 16:
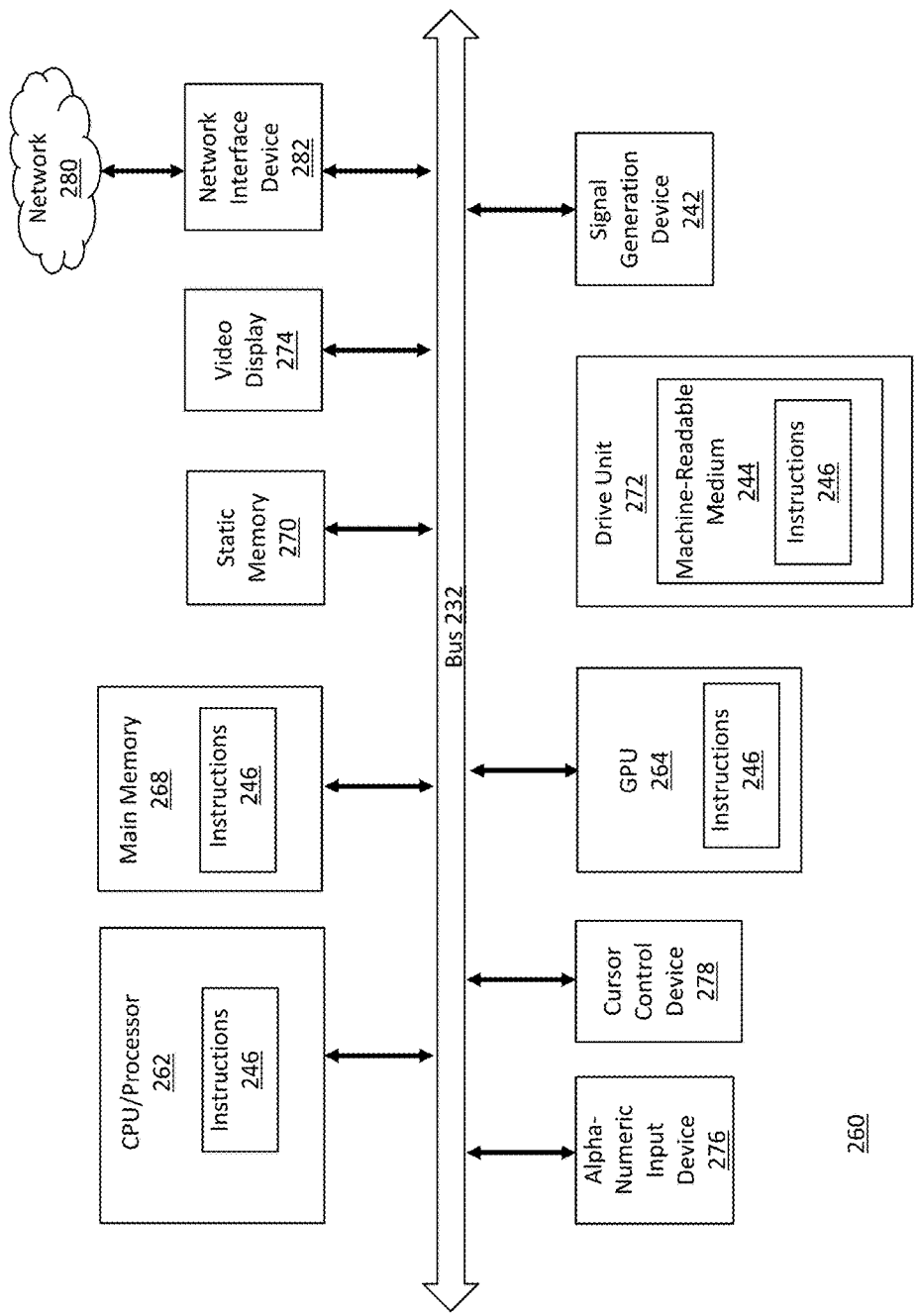
FIG. 16 is a block diagram illustrating an example of a computer device on which computer-executable instructions to perform the robotic methodologies discussed herein may be installed and executed.

FIG. 16 is a block diagram illustrating an exemplary computer system for processing the push notifications upon which a computing embodiment of the present disclosure may be implemented. A computer system 260 includes a processor 262 (e.g.; a central processing unit (CPU); a graphics processing unit (GPU); or both) are coupled to a bus 266 or other communication medium for sending and receiving information. The processors 262, 264 may be an example for implementing a computer on the mobile device, or other equivalent processors that are used to perform various functions described herein. In some cases, the computer system 260 may be used to implement the CPU 262 and the GPU 264 as a system-on-a-chip integrated circuit. The computer system 260 also includes a main memory 268, such as a random access memory (RAM) or other dynamic storage device, coupled to the bus 232 for storing information and instructions 246 to be executed by the CPU 262 and the GPU 264. The main memory 228 also may be used for storing temporary variables or other intermediate information during execution of instructions 246 by the CPU 262 and the GPU 264. The computer system 260 further includes a read only memory (ROM) 270 or other static storage device coupled to the bus 232 for storing static information and instructions 246 for the CPU 262 and the GPU 264. A data storage device 272, such as a magnetic disk (e.g., a hard disk drive), an optical disk, or a flash memory, is provided and coupled to the bus 232 for storing information and instructions 246. The computer system 260 (e.g., desktops, laptops, tablets) may operate on any operating system platform using Windows® by Microsoft Corporation, MacOS or iOS by Apple, Inc., Linux, UNIX, and/or Android by Google Inc.

The computer system 260 may be coupled via the bus 232 to a display 274, such as a flat panel for displaying information to a user. An input device 276, including alphanumeric, pen or finger touchscreen input, other keys, or voice activated software application (also referred to as intelligent personal assistant or a software application that uses a natural language user interface) is coupled to the bus 232 for communicating information and command selections to the processor 402. Another type of user input device is cursor control 278, such as a mouse (either wired or wireless), a trackball, a laser remote mouse control, or cursor direction keys for communicating direction information and command selections to the CPU 262 and the GPU 264 and for controlling cursor movement on the display 274. This input device typically has two degrees of freedom in two axes, a first axis (e.g., x) and a second axis (e.g., y), that allows the device to specify positions in a plane.

The computer system 260 may be used for performing various functions (e.g., calculation) in accordance with the embodiments described herein. According to one embodiment, such use is provided by the computer system 260 in response to the CPU 262 and the GPU 264 executing one or more sequences of one or more instructions contained in the main memory 268. Such instructions may be read into the main memory 268 from another computer-readable medium 244, such as storage device 272. Execution of the sequences of instructions contained in the main memory 228 causes the CPU 262 and the GPU 264 to perform the processing steps described herein. One or more processors in a multi-processing arrangement may also be employed to execute the sequences of instructions contained in the main memory 228. In alternative embodiments, hard-wired circuitry may be used in place of or in combination with software instructions to implement the present disclosure. Thus, embodiments of the present disclosure are not limited to any specific combination of hardware circuitry and software.

The term "computer-readable medium" as used herein refers to any medium that participates in providing instructions to the CPU 262 and the GPU 264 for execution. Common forms of computer-readable media include, but are not limited to, non-volatile media, volatile media, transmission media, a floppy disk, a flexible disk, a hard disk, magnetic tape, any other magnetic medium, a CD-ROM, a DVD, a Blu-ray Disc, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read. Non-volatile media includes, for example, optical or magnetic disks, such as the storage device 240. Volatile media includes dynamic memory, such as the main memory 228. Transmission media includes coaxial cables, copper wire, and fiber optics. Transmission media can also take the form of acoustic or light waves, such as those generated during radio wave and infrared data communications.

Various forms of computer-readable media may be involved in carrying one or more sequences of one or more instructions to the CPU 402 and the GPU 404 for execution. For example, the instructions may initially be carried on a magnetic disk of a remote computer. The remote computer can load the instructions into its dynamic memory and send the instructions over a network 280 through a network interface device 282. The bus 232 carries the data to the main memory 228, from which the CPU 262 and the GPU 264 retrieve and execute the instructions. The instructions received by the main memory 268 may optionally be stored on the storage device 272 either before or after execution by the CPU 262 and the GPU 264.

The communication interface 282, which is coupled to the bus 232, provides a two-way data communication coupling to the network 280. For example, the communication interface 282 may be implemented in a variety of ways, such as an integrated services digital network (ISDN), a local area network (LAN) card to provide a data communication connection to a compatible LAN, a Wireless Local Area Network (WLAN) and Wide Area Network (WAN), Bluetooth, and a cellular data network (e.g. 3G, 4G). In wireless links, the communication interface 282 sends and receives electrical, electromagnetic or optical signals that carry data streams representing various types of information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

The invention can be implemented in numerous ways, including as a process, an apparatus, and a system. In this specification, these implementations, or any other form that the invention may take, may be referred to as techniques. In general, the order of the connections of disclosed apparatus may be altered within the scope of the invention.

The present invention has been described in particular detail with respect to some possible embodiments. Those skilled in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. An ordinary artisan should require no additional explanation in developing the methods and systems described herein but may nevertheless find some possibly helpful guidance in the preparation of these methods and systems by examining standard reference works in the relevant art.

These and other changes can be made to the invention in light of the above detailed description. In general, in the following claims, the terms used should not be construed to limit the invention to the specific embodiments disclosed in the specification and the claims, but should be construed to include all methods and systems that operate under the claims set forth herein below. Accordingly, the invention is not limited by the invention, but instead its scope is to be determined entirely by the following claims.

What is claimed and desired to be secured by Letters Patent of the United States is:

1. A computer-implemented method for blending at least two three-dimensional volumetric structures, the computer-implemented method comprising:
   associating, via a processor, a first primary color and a first translucency to a first dataset sourced from a medical scanner, and a second primary color and a second translucency to a second dataset sourced from the medical scanner, each of the first dataset and the second dataset having a respective three-dimensional surface representation of a mammalian anatomical structure, the first primary color is visually distinct from the second primary color, the medical scanner captured the first dataset and the second dataset at different times;
   assigning, via the processor, a color coding scheme to a set of distance differential values, the color coding scheme having a continuous color range, the set of distance differential values is associated with the first dataset and the second dataset;
   shading, via the processor, a surface of a three-dimensional surface representation associated with at least one of the first dataset or the second dataset on a display based on the color coding scheme that corresponds to the set of distance differential values; and
   blending, via the processor, the first and second datasets by visualizing, via the processor, the translucent surfaces of the first and second datasets on the display to produce, via the processor, a blended, volumetric, and interactive representation of the first and second translucent surface datasets simultaneously on the display as the mammalian anatomical structure, the blended representation is depicted in a secondary color as blended from the first primary color based on the first translucency and the second primary color based on the second translucency such that an improvement or deterioration difference of the mammalian anatomical structure between the different times is visually noticeable and such that the set of distance differential values is set to the color coding scheme and is modified based on at least one of rotating or panning the blended representation while the opacity of the blended representation is changing, the processor is in communication with the display.

2. The method of claim 1, after the blending step, further comprising transforming the first and second three-dimensional datasets, the first and second three-dimensional datasets having a geometric relationship.

3. The method of claim 1, wherein the three-dimensional surface representation comprises a human body surface or an organ surface.

4. The method of claim 1, wherein the secondary color comprises a variance of blended color intensity between the first primary color and the second primary color.

5. The method of claim 1, wherein the three-dimensional surface representation comprises a region of interest on a human body or human organ.

6. The method of claim 1, wherein the first primary color is selected as a mix well with the second primary color.

7. The method of claim 1, wherein the first primary color is blue and the second primary color is yellow.

8. The method of claim 1, wherein at least one of the first or second primary colors includes a color selected from a group consisting of blue, yellow, and red.

9. The method of claim 1, wherein the secondary color includes a color is selected from a group consisting of green, orange, and purple.

10. The method of claim 1, wherein the three-dimensional surface representation comprises a compilation of data sourced from any professional field, each data compilation in the selected professional field having source and target volumes divided into segmented structures associated with the three-dimensional surface representation.

11. A method for computing a first three-dimensional surface representation and a second three-dimensional surface representation, the first three-dimensional surface representation having a first set of sampling points, the second three-dimensional surface representation having a second set of sampling points, the method comprising:
   computing, via a processor, a distance differential at the second set of sampling points of the second three-dimensional surface representation from the first set of sampling points of the first three-dimensional surface representation, thereby generating, via the processor, a set of distance differential values between the first set of sampling points and the second set of sampling points, the first three-dimensional surface representation is visually distinct from the second three-dimensional surface representation, the first three-dimensional surface representation is sourced from a medical scanner, the second three-dimensional surface representation is sourced from the medical scanner, each of the first three-dimensional surface representation and the second three-dimensional surface representation depict a mammalian anatomical structure, the first three-dimensional surface representation and the second three-dimensional surface representation captured via the medical scanner at different times;
   assigning, via the processor, a color coding scheme to the set of distance differential values, the color coding scheme having a continuous color range; and
   shading, via the processor, the surface of the second three-dimensional surface representation on a display based on the color coding scheme that corresponds to the distance differential values, the processor is in communication with the display; and
   transforming, via the processor, first and second datasets by visualizing, via the processor, translucent surfaces of the first and second datasets on the display to produce, via the processor, a blended, volumetric, and interactive representation of the first and second translucent surface datasets simultaneously on the display as the mammalian anatomical structure, the blended representation is depicted in a secondary color as blended from a first primary color based on a first translucency and a second primary color based on a second translucency such that an improvement or deterioration difference of the mammalian anatomical structure between the different times is visually noticeable and such that the set of distance differential values is set to the color coding scheme and is modified based on at least one of rotating or panning the blended representation while the opacity of the blended representation is changing, the first dataset associated with the first three-dimensional surface representation, the second dataset associated with the second three-dimensional surface representation.

12. The method of claim 11, prior to the computing step, further comprising placing the first set sampling points on a grid map having a plurality of grid cells, the second set of sampling points being the vertices of the second three-dimensional surface.

13. The method of claim 12, wherein each sampling point in the first set of sampling points is placed in the center of its respective grid cell.

14. The method of claim 13, after the placing step, further comprising computing a set of distance field values by determining the differences between the center points in the grid cells from the closest points to the first three-dimensional surface.

15. The method claim 14, wherein the distance differential values are computed by interpolating the distance field values of the multiple surrounding neighboring grid cells relative to a respective vertex in the second three-dimensional surface.

16. A system for blending two three-dimensional volumetric structures, the system comprising:
a processor;
a memory in communication with the processor;
a display in communication with the processor;
an assignment module stored in the memory, executable via the processor, and configured to associate, via the processor, a first primary color and a first translucency to a first dataset sourced from a medical scanner, and a second primary color and a second translucency to a second dataset sourced from the medical scanner, each of the first dataset and the second dataset having a respective three-dimensional surface representation of a mammalian anatomical structure, the first primary color visually distinct from the second primary color, the medical scanner captured the first dataset and the second dataset at different times, the assignment module is configured to assign a color coding scheme to a set of distance differential values, the color coding scheme having a continuous color range;
a shading module configured to shade a surface of the second three-dimensional surface representation on the display based on the color coding scheme that corresponds to the set of distance differential values, the processor is in communication with the display; and
a conversion module stored in the memory, executable via the processor, and configured to transform, via the processor, the first and second datasets by visualizing, via the processor, the translucent surfaces of the first and second datasets on the display to produce, via the processor, a blended, volumetric, and interactive representation of the first and second translucent surface datasets simultaneously on the display as the mammalian anatomical structure, the blended representation is depicted in a secondary color as blended from the first primary color based on the first translucency and the second primary color based on the second translucency such that an improvement or deterioration difference of the mammalian anatomical structure between the different times is visually noticeable and such that the set of distance differential values is set to the color coding scheme and is modified based on at least one of rotating or panning the blended representation while the opacity of the blended representation is changing.

17. The system of claim 16, wherein the conversion module comprises transforming the first and second three-dimensional datasets, the first and second three-dimensional datasets having a geometric relationship.

18. A system for computing a first three-dimensional surface representation and a second three-dimensional surface representation, the first three-dimensional surface representation having a first set of sampling points, the second three-dimensional surface representation having a second set of sampling points, the system comprising:
a processor;
a memory in communication with the processor;
a display in communication with the processor;
a distance field computation, color to vertex assignment and shading module stored in the memory, executable via the processor, and configured to compute, via the processor, a distance differential at the second set of sampling points of the second three-dimensional surface representation from the first set of sampling points of the first three-dimensional surface representation, where the first three-dimensional surface representation is visually distinct from the second three-dimensional surface representation, thereby generating, via the processor, a set of distance differential values between the first set of sampling points and the second set of sampling points, to assign, via the processor, a color coding scheme to the set of distance differential values, the color coding scheme having a continuous color range, and to shade, via the processor, the surface of the second three-dimensional surface representation on the display based on the color coding scheme that corresponds to the distance differential values, the first three-dimensional surface representation is sourced from a medical scanner, the second three-dimensional surface representation is sourced from the medical scanner, each of the first three-dimensional surface representation and the second three-dimensional surface representation depict a mammalian anatomical structure, the first three-dimensional surface representation and the second three-dimensional surface representation captured via the medical scanner at different times; and
a conversion module stored in the memory, executable via the processor, and configured to transform, via the processor, the first and second datasets by visualizing, via the processor, the translucent surfaces of the first and second datasets on the display to produce, via the processor, a blended, volumetric, and interactive representation of the first and second translucent surface datasets simultaneously on the display as the mammalian anatomical structure, the blended representation is depicted in a secondary color as blended from a first primary color based on a first translucency and a second primary color based on a second translucency such that an improvement or deterioration difference of the mammalian anatomical structure between the different times is visually noticeable and such that the set of distance differential values is set to the color coding scheme and is modified based on at least one of rotating or panning the blended representation while the opacity of the blended representation is changing.

* * * * *